US011284068B2

(12) United States Patent
Zhang et al.

(10) Patent No.: US 11,284,068 B2
(45) Date of Patent: Mar. 22, 2022

(54) INDICATION METHOD OF MAXIMUM NUMBER OF CANDIDATES

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/199,925

(22) Filed: Mar. 12, 2021

(65) Prior Publication Data

US 2021/0250602 A1    Aug. 12, 2021

Related U.S. Application Data

(63) Continuation of application No. PCT/CN2019/122821, filed on Dec. 3, 2019.

(30) Foreign Application Priority Data

Dec. 3, 2018    (WO) ................ PCT/CN2018/118896

(51) Int. Cl.
*H04N 11/02* (2006.01)
*H04N 19/105* (2014.01)
(Continued)

(52) U.S. Cl.
CPC ......... *H04N 19/105* (2014.11); *H04N 19/109* (2014.11); *H04N 19/137* (2014.11);
(Continued)

(58) Field of Classification Search
CPC .................................................... H04N 19/513
(Continued)

(56) References Cited

U.S. PATENT DOCUMENTS 10,257,539 B2    4/2019  An et al.
10,778,997 B2    9/2020  Zhang et al.
(Continued)

FOREIGN PATENT DOCUMENTS

CN    102870414 A    1/2013
CN    104126302 A    10/2014
(Continued)

OTHER PUBLICATIONS

Bross et al. "Versatile Video Coding (Draft 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1001, 2018.
(Continued)

*Primary Examiner* — Leron Beck
(74) *Attorney, Agent, or Firm* — Perkins Coie LLP

(57) ABSTRACT

Techniques for video processing are described. One example method includes determining an indication that indicates a maximum number of candidates allowed in a candidate list for at least one video block in a video, the maximum number of candidates allowed in the candidate list corresponding to at least one of a maximum number of candidates in a geometry partition mode (GEO) based merge candidate list, a maximum number of base candidates in a merge with motion vector difference (MMVD) merge candidate list, a maximum number of base candidates in a sub-block based MMVD merge candidate list, and a maximum number of candidates in a geometry partition mode based affine merge candidate list; and performing video processing on the at least one video block based on the indication.

20 Claims, 33 Drawing Sheets

US 11,284,068 B2
Page 2

(51) Int. Cl.
*H04N 19/176* (2014.01)
*H04N 19/503* (2014.01)
*H04N 19/109* (2014.01)
*H04N 19/513* (2014.01)
*H04N 19/137* (2014.01)
*H04N 19/139* (2014.01)
*H04N 19/159* (2014.01)

(52) U.S. Cl.
CPC ......... *H04N 19/176* (2014.11); *H04N 19/503* (2014.11); *H04N 19/513* (2014.11); *H04N 19/139* (2014.11); *H04N 19/159* (2014.11)

(58) Field of Classification Search
USPC ........................................ 375/240.01–240.29
See application file for complete search history.

(56) References Cited

U.S. PATENT DOCUMENTS

| | | | |
|---|---|---|---|
| 10,873,756 B2 | 12/2020 | Zhang et al. | |
| 2002/0176500 A1* | 11/2002 | Bakhmutsky | H04N 19/61 375/240.13 |
| 2009/0238274 A1* | 9/2009 | Chujoh | H04N 19/126 375/240.12 |
| 2010/0118959 A1* | 5/2010 | Lou | H04N 19/197 375/240.16 |
| 2010/0208827 A1* | 8/2010 | Divorra Escoda | H04N 19/61 375/240.24 |
| 2010/0316257 A1* | 12/2010 | Xu | G06K 9/3241 382/103 |
| 2011/0142133 A1* | 6/2011 | Takahashi | G06N 3/10 375/240.16 |
| 2012/0147961 A1* | 6/2012 | Guo | H04N 19/147 375/240.16 |
| 2012/0189055 A1* | 7/2012 | Chien | H04N 19/52 375/240.14 |
| 2012/0230408 A1 | 9/2012 | Zhou | |
| 2013/0003843 A1 | 1/2013 | Guo et al. | |
| 2013/0070854 A1* | 3/2013 | Wang | H04N 19/52 375/240.16 |
| 2013/0101042 A1* | 4/2013 | Sugio | H04N 19/192 375/240.16 |
| 2013/0107959 A1* | 5/2013 | Park | H04N 19/521 375/240.15 |
| 2013/0114717 A1* | 5/2013 | Zheng | H04N 19/52 375/240.14 |
| 2013/0202038 A1* | 8/2013 | Seregin | H04N 19/52 375/240.15 |
| 2013/0294513 A1 | 11/2013 | Seregin et al. | |
| 2014/0185664 A1* | 7/2014 | Van Der Auwera | H04N 19/33 375/240.02 |
| 2014/0192883 A1* | 7/2014 | Seregin | H04N 19/33 375/240.16 |
| 2019/0116374 A1 | 4/2019 | Zhang et al. | |
| 2020/0014948 A1 | 1/2020 | Lai et al. | |
| 2020/0059658 A1 | 2/2020 | Chien et al. | |
| 2020/0084468 A1 | 3/2020 | Chien et al. | |
| 2020/0107017 A1 | 4/2020 | Hung et al. | |
| 2020/0112715 A1 | 4/2020 | Hung et al. | |
| 2020/0112741 A1 | 4/2020 | Han et al. | |
| 2020/0137387 A1* | 4/2020 | Zhao | H04N 19/51 |
| 2020/0137398 A1 | 4/2020 | Zhao et al. | |
| 2020/0169745 A1 | 5/2020 | Han et al. | |
| 2020/0195959 A1 | 6/2020 | Zhang et al. | |
| 2020/0195960 A1 | 6/2020 | Zhang et al. | |
| 2020/0374542 A1 | 11/2020 | Zhang et al. | |
| 2020/0382770 A1 | 12/2020 | Zhang et al. | |
| 2020/0396446 A1 | 12/2020 | Zhang et al. | |
| 2020/0396447 A1 | 12/2020 | Zhang et al. | |
| 2020/0396466 A1 | 12/2020 | Zhang et al. | |
| 2020/0404285 A1 | 12/2020 | Zhang et al. | |
| 2020/0404316 A1 | 12/2020 | Zhang et al. | |
| 2020/0404320 A1 | 12/2020 | Zhang et al. | |
| 2020/0413038 A1 | 12/2020 | Zhang et al. | |
| 2021/0006780 A1 | 1/2021 | Zhang et al. | |
| 2021/0006788 A1 | 1/2021 | Zhang et al. | |
| 2021/0006790 A1 | 1/2021 | Zhang et al. | |
| 2021/0006803 A1 | 1/2021 | Zhang et al. | |
| 2021/0006819 A1 | 1/2021 | Zhang et al. | |
| 2021/0006823 A1 | 1/2021 | Zhang et al. | |
| 2021/0014520 A1 | 1/2021 | Zhang et al. | |
| 2021/0014525 A1 | 1/2021 | Zhang et al. | |
| 2021/0029351 A1 | 1/2021 | Zhang et al. | |
| 2021/0029366 A1 | 1/2021 | Zhang et al. | |
| 2021/0029372 A1 | 1/2021 | Zhang et al. | |
| 2021/0051324 A1 | 2/2021 | Zhang et al. | |
| 2021/0058637 A1 | 2/2021 | Zhang et al. | |
| 2021/0092379 A1 | 3/2021 | Zhang et al. | |
| 2021/0092436 A1 | 3/2021 | Zhang et al. | |
| 2021/0105482 A1 | 4/2021 | Zhang et al. | |
| 2021/0120234 A1 | 4/2021 | Zhang et al. | |
| 2021/0203922 A1 | 7/2021 | Zhang et al. | |

FOREIGN PATENT DOCUMENTS

| | | |
|---|---|---|
| CN | 104811733 A | 7/2015 |
| CN | 104980762 A | 10/2015 |
| CN | 105308958 A | 2/2016 |
| CN | 105325002 A | 2/2016 |
| CN | 105340275 A | 2/2016 |
| CN | 106105195 A | 11/2016 |
| CN | 106464889 A | 2/2017 |
| CN | 106464905 A | 2/2017 |
| WO | 2014043374 A1 | 3/2014 |
| WO | 2015103747 A1 | 7/2015 |
| WO | 2017048008 A1 | 3/2017 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-31001, 2017.

Chen et al. "CE4: Affine Merge Enhancement with Simplification (Test 4.2.2)," Joint Video Experts Team (JVEI) of ITU-T SG 16 WP 3 and ISO/IEC JTC 1/SC 29/WG 11, 12th Meeting: Macao, CN, Oct. 3-12, 2018, document JVET-L0368, 2018.

Chen et al. "Crosscheck of JVET-L0142 (CE4: Simplification of the Common Base for Affine Merge (Test 4.2.6))," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0632, 2018.

JEM-7.0: https://jvet.hhi.fraunhofer.de/svn/svn_HMJEMSoftware/ tags/ HM-16.6-JEM-7.0.

https://vcgit.hhi.fraunhofer.de/jvet/VVCSoftware_VTM/tags/VTM-3.0.

Han et al. "CE4.1.3: Affine Motion Compensation Prediction," Joint Video Exploration Team (JVET) of ITU-T SG 16 WP 3 and ISO/IEC JTC 1/SC 29/WG 11, 11th meeting, Ljubljana, SI, Jul. 10-18, 2018, document JVET-K0337, 2018.

Huang et al. "CE4.2.5: Simplification of Affine Merge List Construction and Move ATMVP to Affine Merge List," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0278, 2018.

"Information Technology—High Efficiency Coding and Media Delivery in Heterogeneous Environments—Part 2: High Efficiency Video Coding" Apr. 20, 2018, ISO/DIS 23008, 4th Edition.

Jeong et al. "CE4 Ulitmate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.

Lee et al. "CE4: Simplification of the Common Base for Affine Merge (Test 4.2.2)," Joint Video Experts Team (JVET) of ITU-T SG 16 WP 3 and ISO/IEC JTC 1/SC 29/WG 11, 12th Meeting, Macau, CN, Oct. 8-12, 2012, document JVET-L0142, 2018.

(56) References Cited

OTHER PUBLICATIONS

Liao et al. "CE10: Triangular Prediction Unit Mode (CE10.3.1 and CE10.3.2)," Joint Video Exploration Team (JVET) of ITU-T SG 16 WP 3 and ISO/IEC JTC 1/SC 29/WG 11, 11th Meeting. Ljubljana, SI, Jul. 10-18, 2018, document JVET-K0144, 2018.

Liao et al. "CE10.3.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124, 2018.

Li et al. "CE4-Extension of Merge and AMVP Candidates for Inter Prediction (Test CE4.4.10)," Joint Video Experts Team (JVET) of ITU-T SG 16 WP 3 and ISO/IEC JTC 1/SC 29/WG 11 12th Meeting, Macao, CN, Oct. 3-12, 2018, document JVET-L0315, 2018.

Paluri et al. "CE4-Related: Merge List Simplification," Joint Video Experts Team (JVET) of ITU-T SG 16 WP 3 and ISO/IEC JTC 1/SC 29/WG 11 12th Meeting, Macau, CN, Oct. 8-12, 2018, document JVET-L0282, 2018.

Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2019, document JCTVC-Y1002, 2016.

Xu et al. "CE4-Related: Constraint of Pruning in History-based Motion Vector Prediction," Joint Video Experts Team (JVET) of ITU-T SG 16 WP 3 and iSO/IEC JTC 1/SC 29/WG 11, 12th Meeting, Macao, CN, Oct. 3-12, 2018, document JVET-L0448, 2018.

Zhao et al. "CE4-Related: Simplification to History Based Motion Vector Prediction (HMVP)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0309, 2018.

International Search Report and Written Opinion from International Patent Application No. PCT/CN2019/122820 dated Feb. 21, 2020 (10 pages).

International Search Report and Written Opinion from International Patent Application No. PCT/CN2019/122821 dated Feb. 24, 2020 (12 pages).

International Search Report and Written Opinion from International Patent Application No. PCT/CN2019/122828 dated Mar. 6, 2020 (10 pages).

International Search Report and Written Opinion from International Patent Application No. PCT/CN2019/122829 dated Mar. 9, 2020 (11 pages).

Non-Final Office Action from U.S. Appl. No. 17/199,985 dated May 27, 2021.

Non-Final Office Action from U.S. Appl. No. 17/199,985 dated Jan. 7, 2022.

\* cited by examiner

INDICATION METHOD OF MAXIMUM NUMBER OF CANDIDATES

CROSS-REFERENCE TO RELATED APPLICATIONS

This application is a continuation of International Patent Application No. PCT/CN2019/122821, filed on Dec. 3, 2019, which claims the priority to and benefits of International Patent Application No. PCT/CN2018/118896, filed on Dec. 3, 2018. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video decoder or encoder embodiments during video decoding or encoding using candidate motion lists.

In one example aspect, a method of video processing is disclosed. The method comprises determining an indication that indicates a maximum number of candidates allowed in a candidate list for at least one video block in a video, wherein the maximum number of candidates allowed in the candidate list corresponds to at least one of a maximum number of candidates in a geometry partition mode (GEO) based merge candidate list, a maximum number of base candidates in a merge with motion vector difference (MMVD) merge candidate list, a maximum number of base candidates in a sub-block based MMVD merge candidate list, and a maximum number of candidates in a geometry partition mode based affine merge candidate list; and performing video processing on the at least one video block based on the indication.

In one example aspect, a method of video processing is disclosed. The method includes generating, during a conversion between a video comprising a current video block and a bitstream representation of the current video block, a list of motion candidates, categorizing the list of motion candidates into a number of categories of motion candidates, wherein each category is assigned a corresponding rule of pruning and performing the conversion by performing the pruning using a pruning method according to the rule of pruning to decide whether a motion candidate could be added to a final list of motion candidates and decoding the block based on the final list.

In another example aspect, another method of video processing is disclosed. The method includes generating a regular merge candidate list by applying a pruning process to history based motion vector predictor (HMVP) candidates using a rule that is based on where merge candidates are derived from and performing a conversion between a current video block and a bitstream representation of the current video block using the regular merge candidate list.

In yet another example aspect, another method of video processing is disclosed. The method includes generating a candidate list by applying a pruning process to geometry predictor mode candidates using a rule that is based on where regular motion vectors from which the geometry predictor mode candidates are derived, and performing a conversion between a current video block and a bitstream representation of the current video block using the candidate list.

In yet another aspect, another method of video processing is disclosed. The method includes performing a determination, for a conversion between a current video block and a bitstream representation of the current video block, to disable use of a pruning operation for history based motion vector predictor table updating processes, wherein the determination is based on a video characteristic and performing the conversion based on the determination to disable use of the pruning operation.

In yet another example aspect, another method of video processing is disclosed. The method includes performing a determination of a maximum number of candidates allowed for at least one of (1) a geometry prediction mode merge candidate list for a current video block, or (2) a maximum number of base merge candidates in a motion vector difference (MMVD) merge candidate list, or (3) a maximum number of merge candidates in a sub-block based MMVD merge candidate list, or (4) a maximum number of affine merge candidates in a geometry prediction mode list, and performing, based on the determination, a conversion between the current video block and a bitstream representation of the current block, wherein the maximum number of candidates is signaled in an indicator in the bitstream representation.

In yet another example aspect, another method of video processing is disclosed. The method includes performing a determination of a maximum number of candidates allowed for at least one of (1) a geometry prediction mode merge candidate list for a current video block, or (2) a maximum number of base merge candidates in a motion vector difference (MMVD) merge candidate list, or (3) a maximum number of merge candidates in a sub-block based MMVD merge candidate list or (4) a maximum number of affine merge candidates in a geometry prediction mode list, and performing, based on the determination, a conversion between the current video block and a bitstream representation of the current block, wherein the maximum number of candidates allowed is determined to be equal to a maximum number of candidates in a regular merge candidate list.

In yet another example aspect, a video encoder apparatus is disclosed. The video encoder apparatus includes a processor that is configured to implement a method described herein.

In yet another example aspect, a video decoder apparatus is disclosed. The video decoder apparatus includes a processor that is configured to implement a method described herein.

In yet another aspect, a computer readable medium having code stored thereupon is disclosed. The code, when executed by a processor, causes the processor to implement a method described in the present document.

These, and other, aspects are described in the present document.

LISTING OF FIGURES

Figure 8:
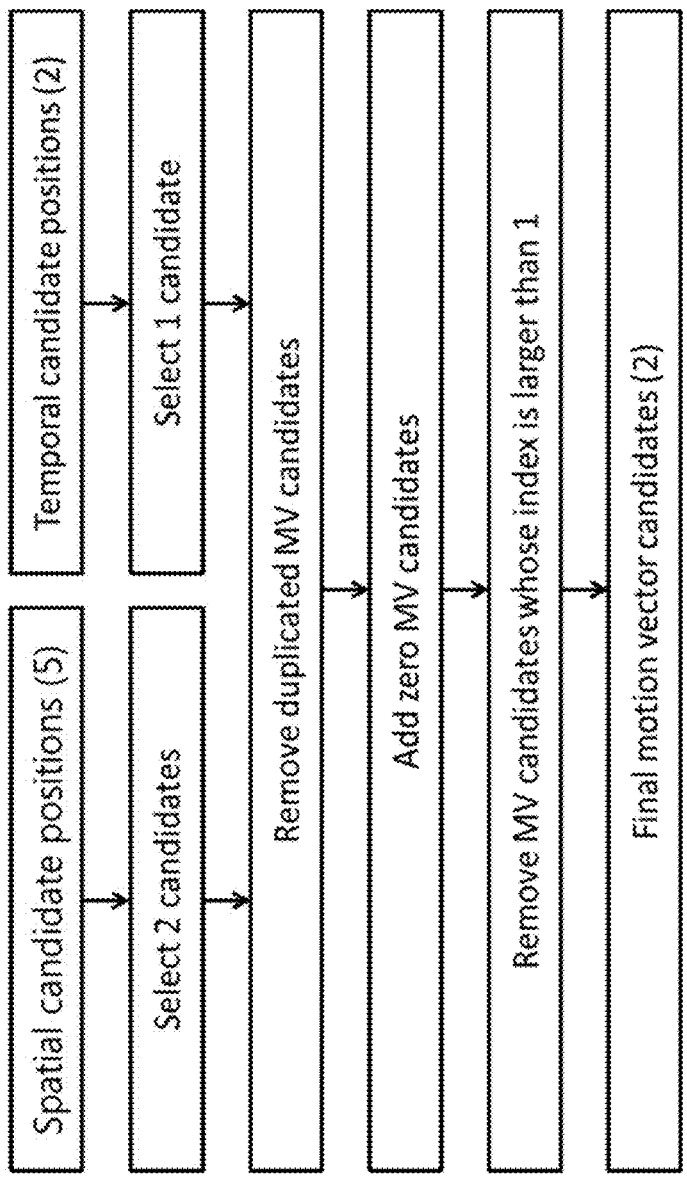

FIG. 8 summarizes derivation process for motion vector prediction candidate.

Figure 9:
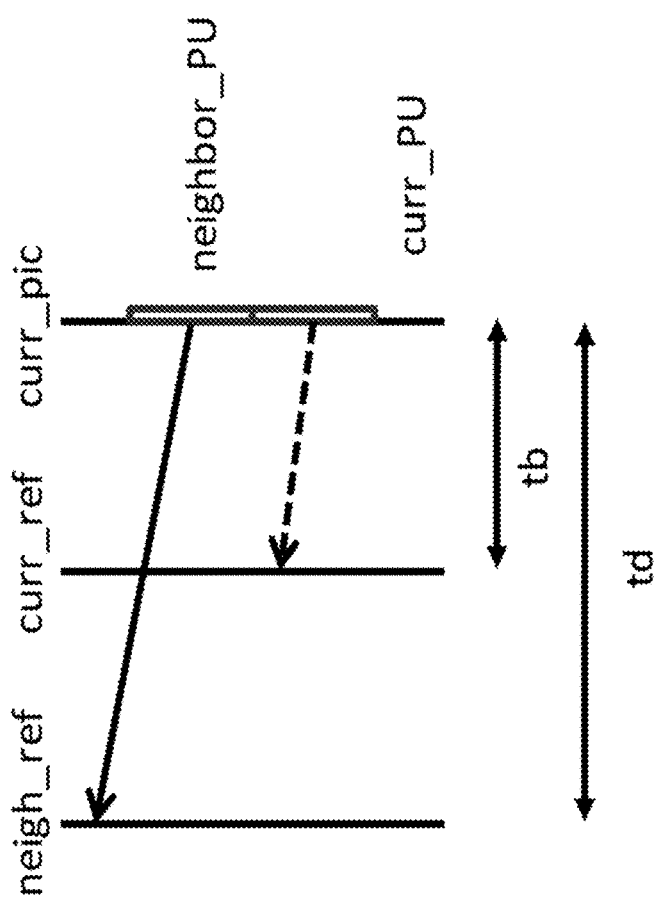

FIG. 9 is an example illustration of motion vector scaling for spatial motion vector candidate.

Figure 10:
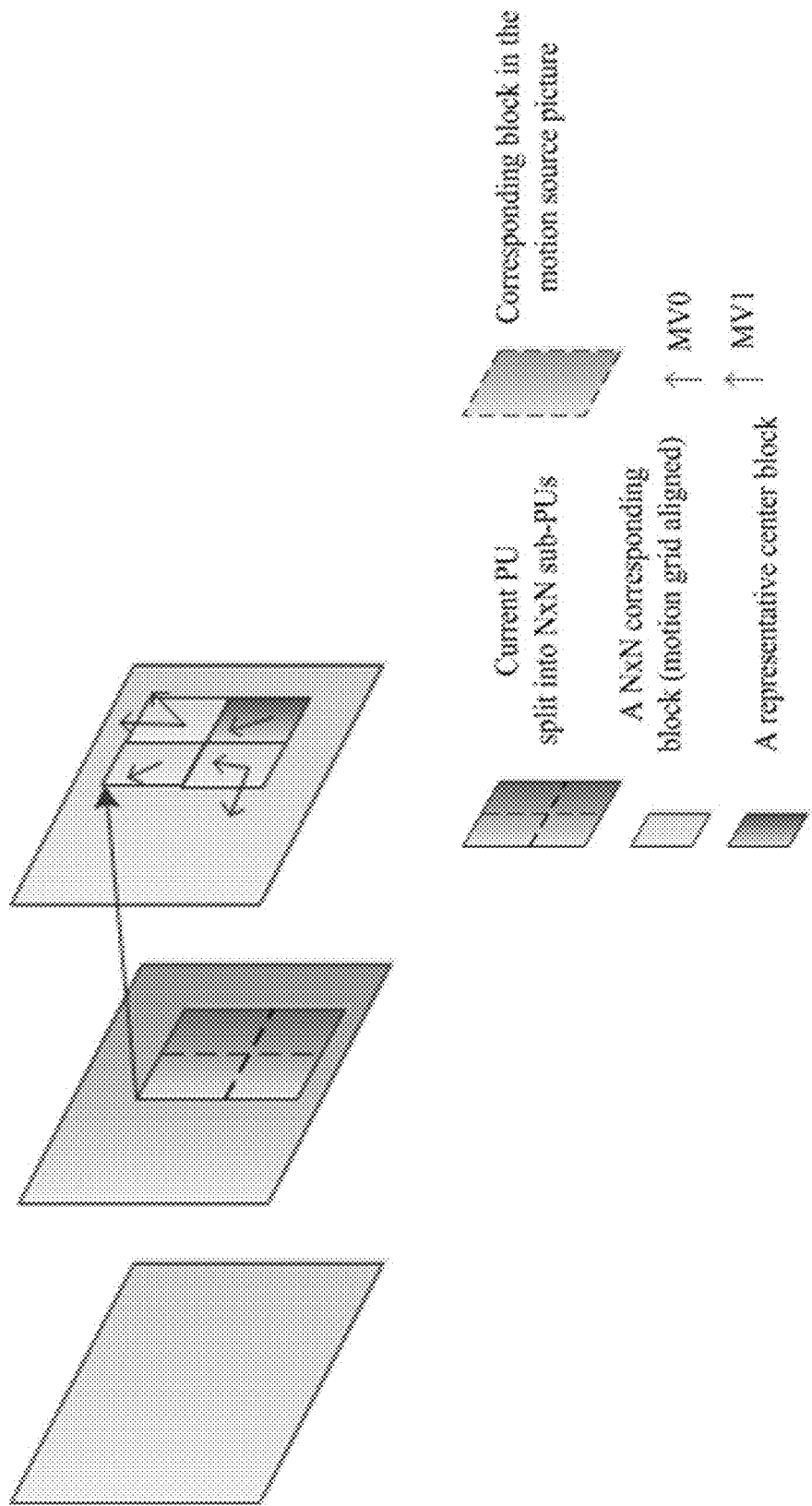

FIG. 10 shows an example of alternative motion vector predictor (ATMVP) motion prediction for a coding unit CU.

Figure 11:
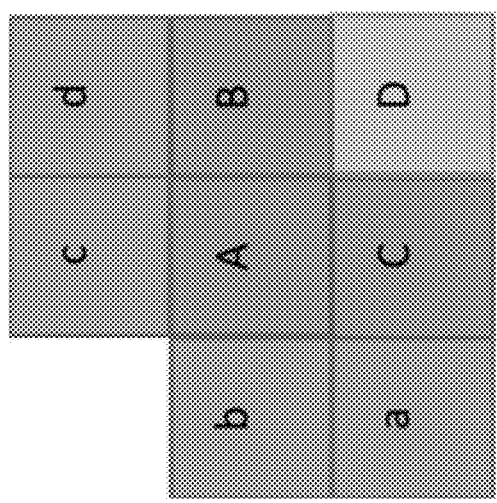

FIG. 11 shows example of one CU with four sub-blocks (A-D) and its neighbouring blocks (a-d).

Figure 12:
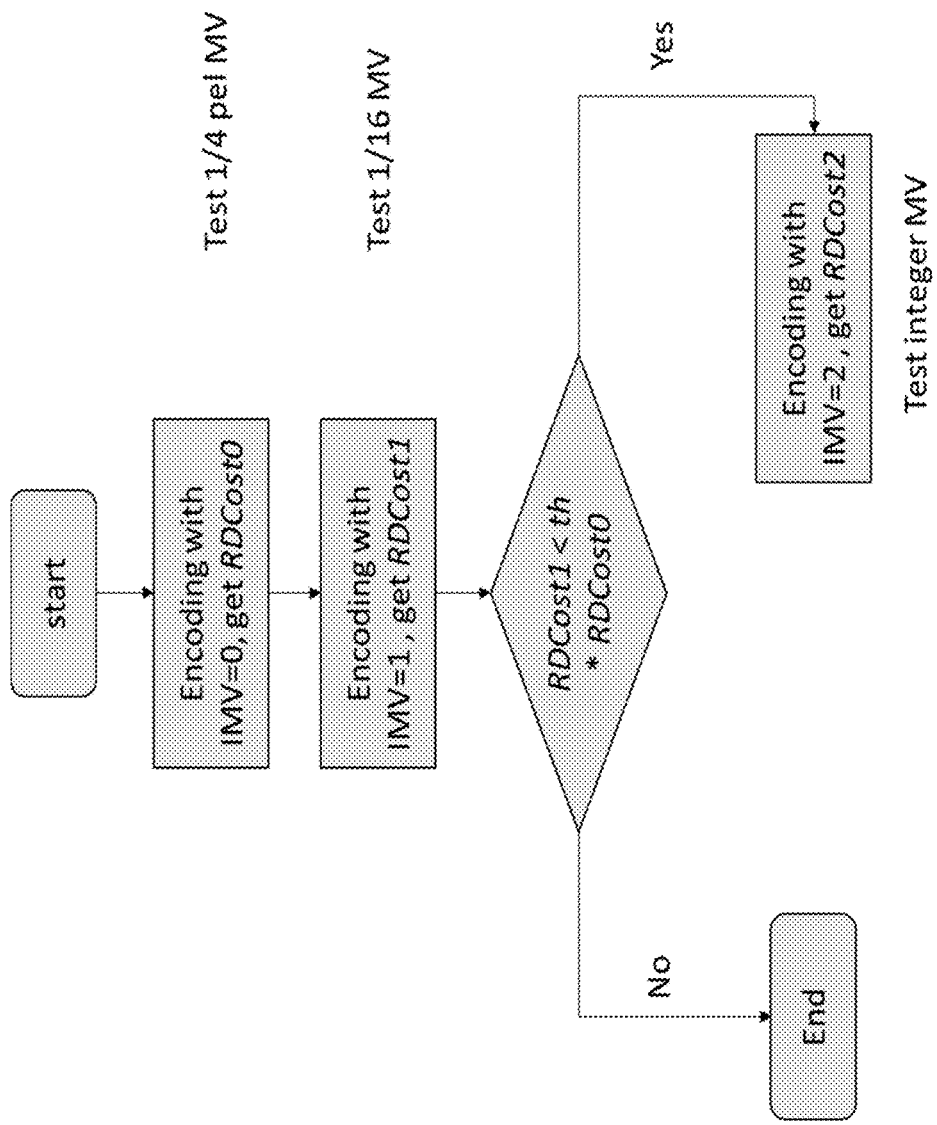

FIG. 12 shows an example flowchart of encoding with different MV precision.

Figure 13A:
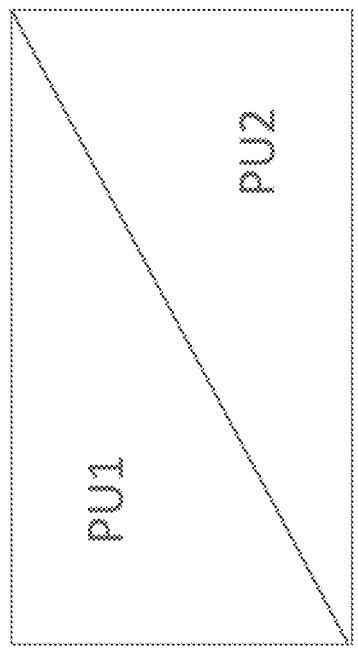

FIG. 13A shows a 135 degree partition type (splitting from top-left corner to bottom-right corner).

Figure 13B:
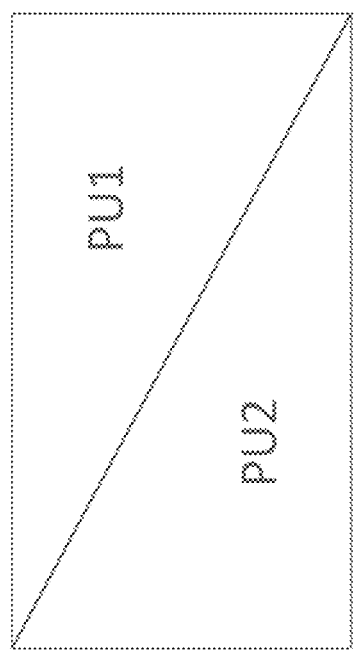

FIG. 13B shows a 45 degree splitting patterns.

Figure 14:
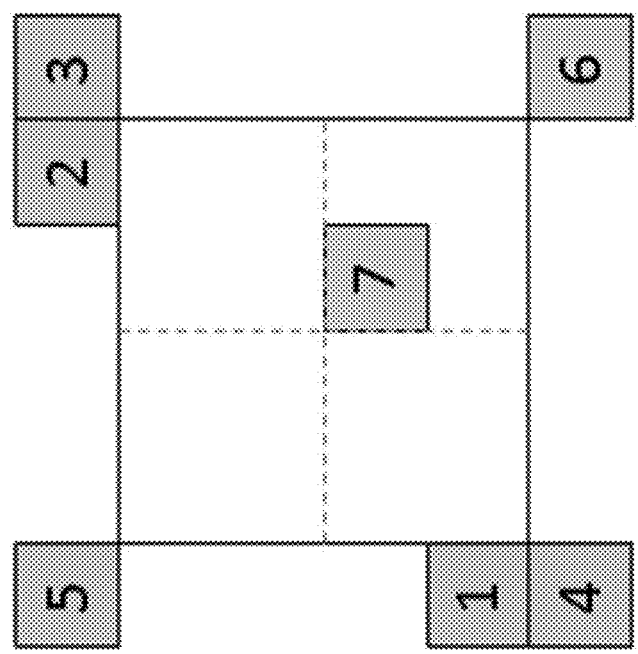

FIG. 14 shows position of the neighboring blocks.

Figure 15:
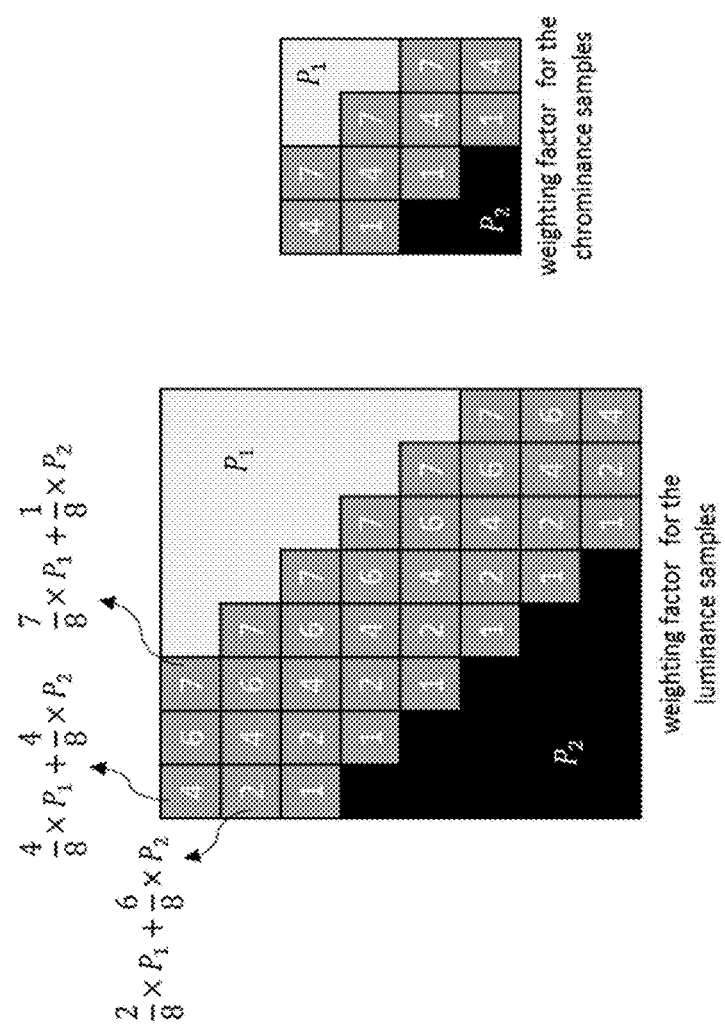

FIG. 15 shows an example of a CU applying the 1st weighting factor group.

Figures 16A, 16B:
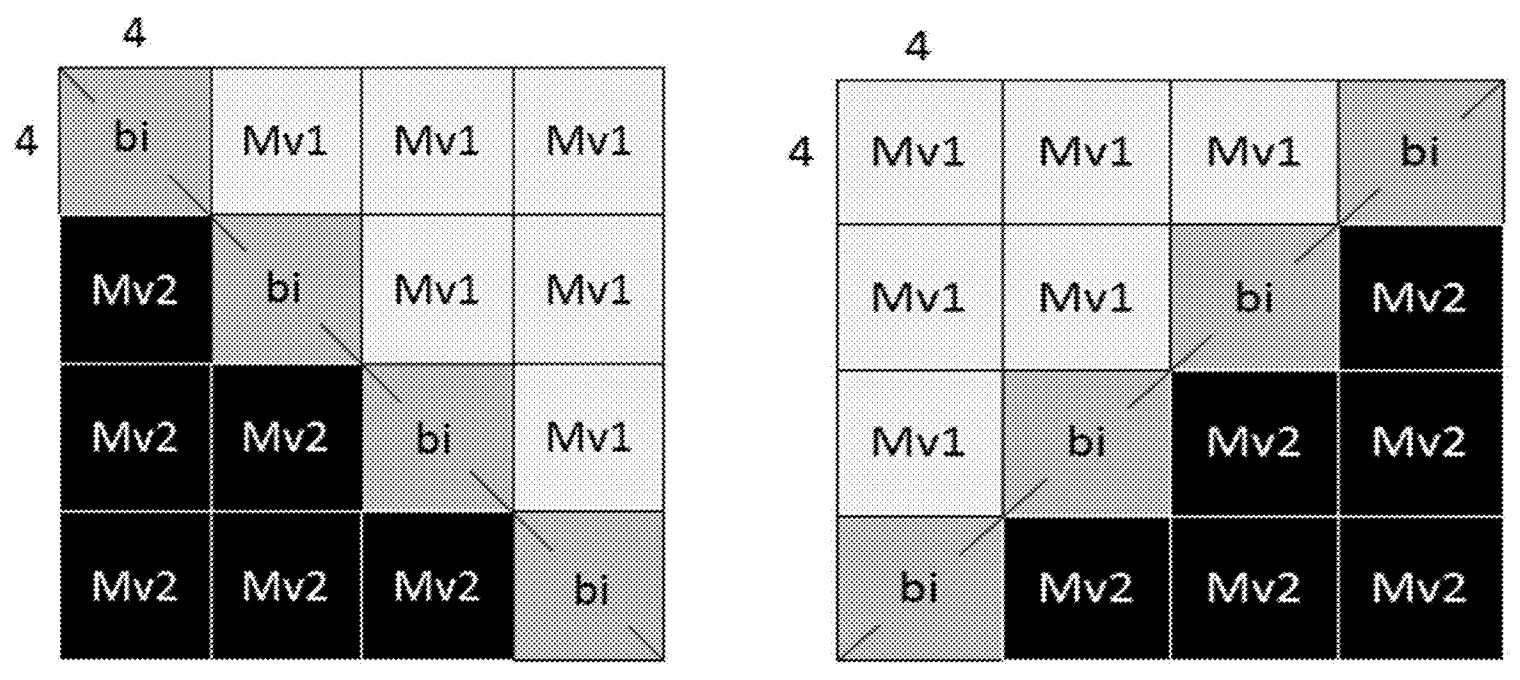

FIG. 16A-16B show examples of motion vector storage.

Figure 17:
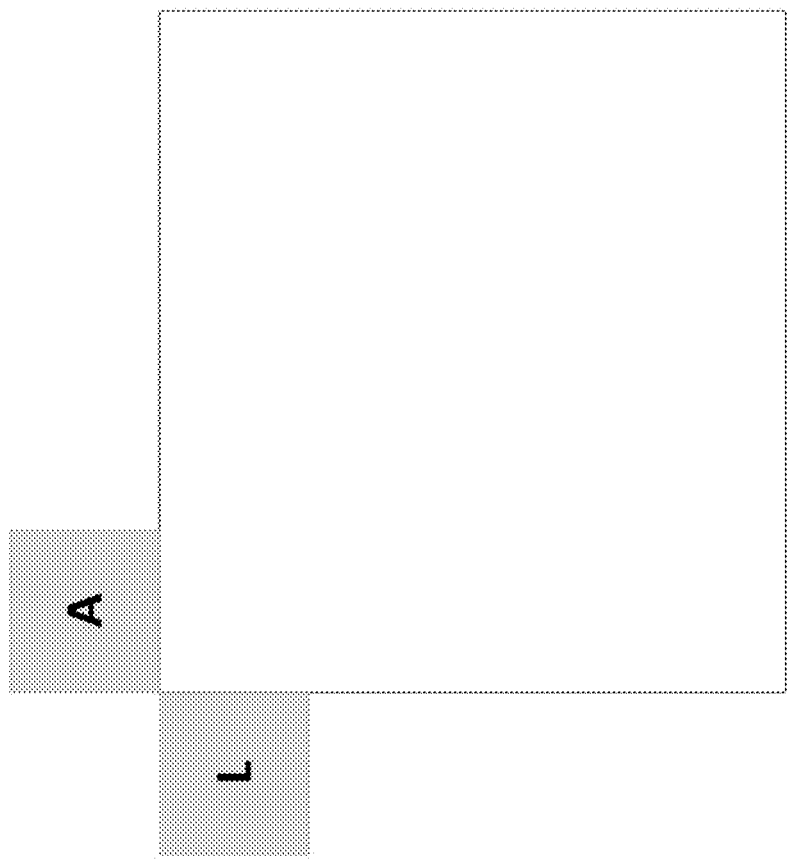

FIG. 17 shows an example of neighboring blocks (A and L) used for context selection in TPM flag coding.

Figures 18A, 18B:
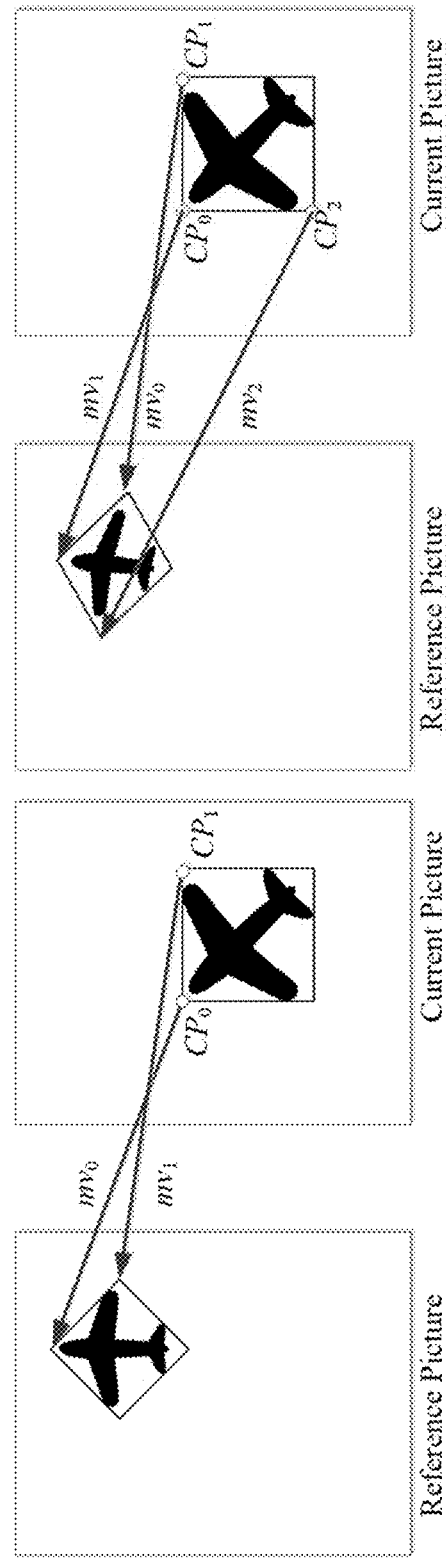

FIG. 18A-18B show respectively 4 and 6 parameter simplified affine motion models.

Figure 19:
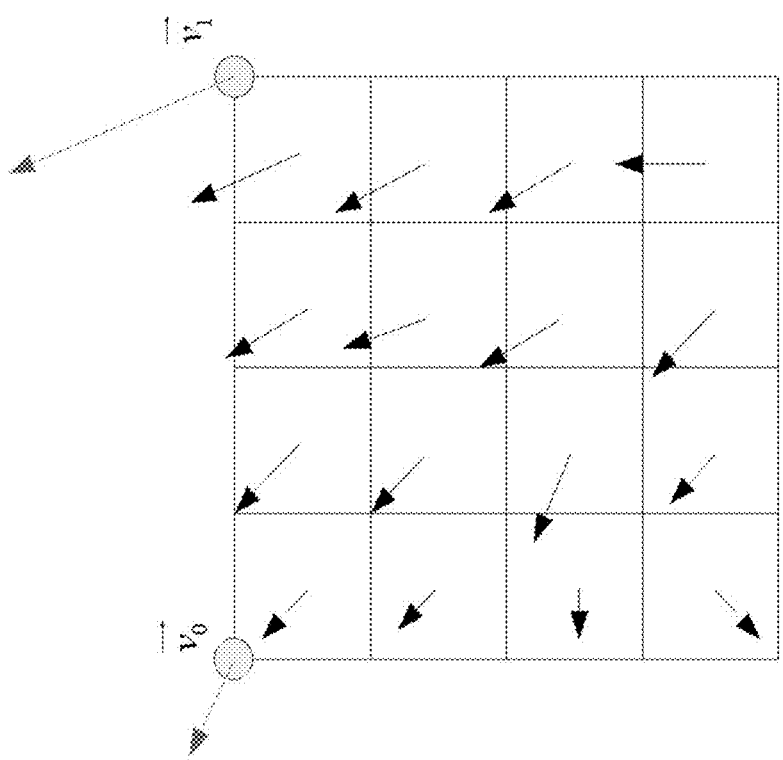

FIG. 19 shows an example of Affine MVF per sub-block.

Figure 20A:
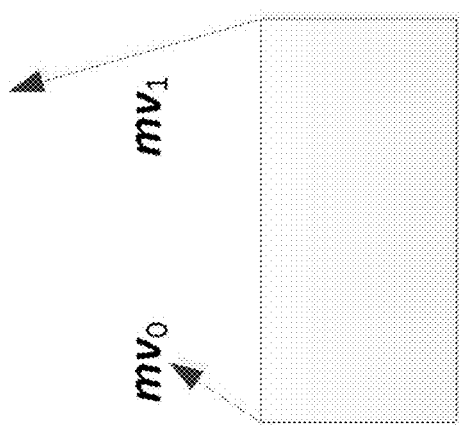

FIG. 20A shows an example of a 4-paramenter affine model.

Figure 20B:
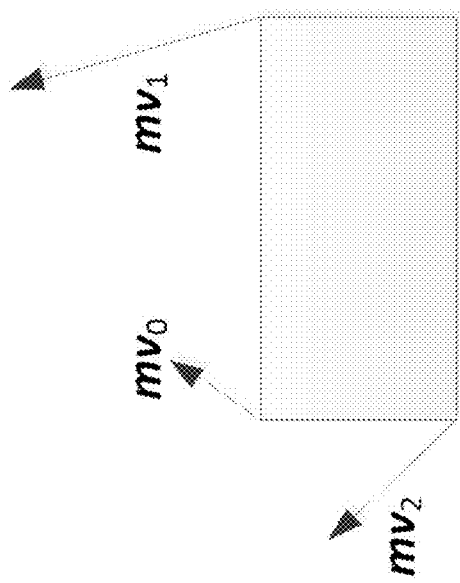

FIG. 20B shows an example of a 6-parameter affine model.

Figure 21:
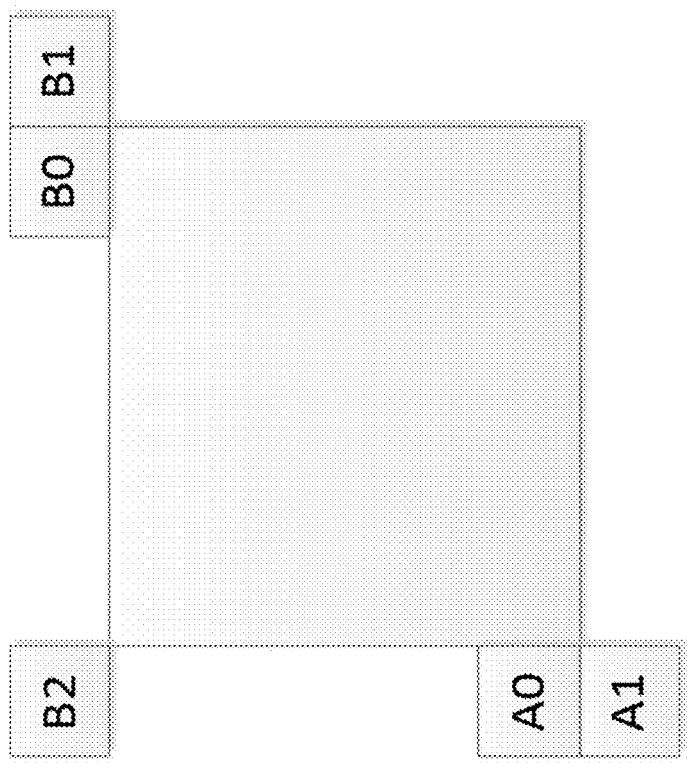

FIG. 21 shows an example of an MVP for AF_INTER for inherited affine candidates.

Figure 22:
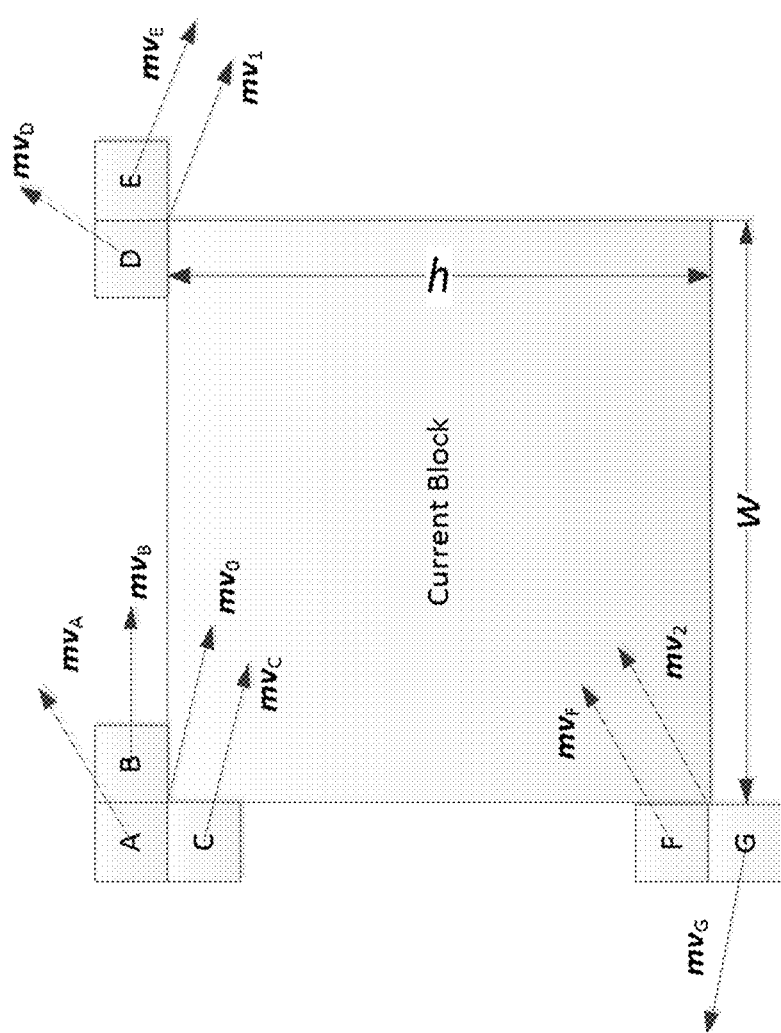

FIG. 22 shows example MVP for AF_INTER for constructed affine candidates.

Figure 23B:
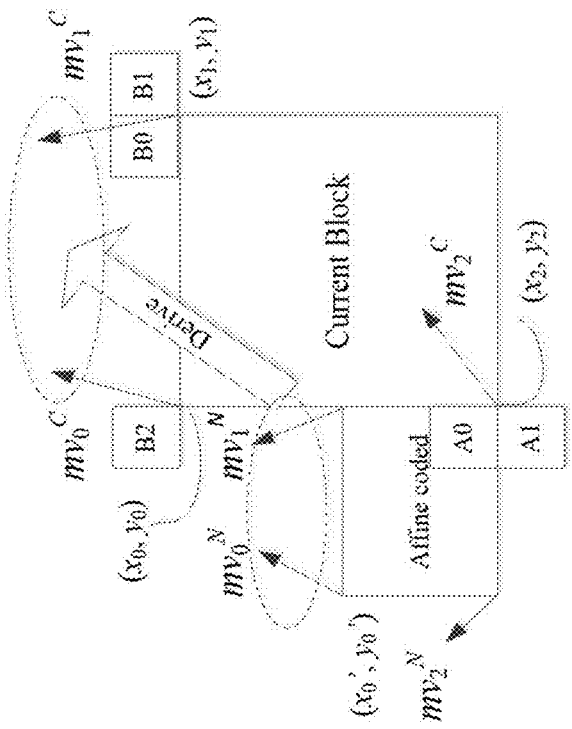
Figure 23A:
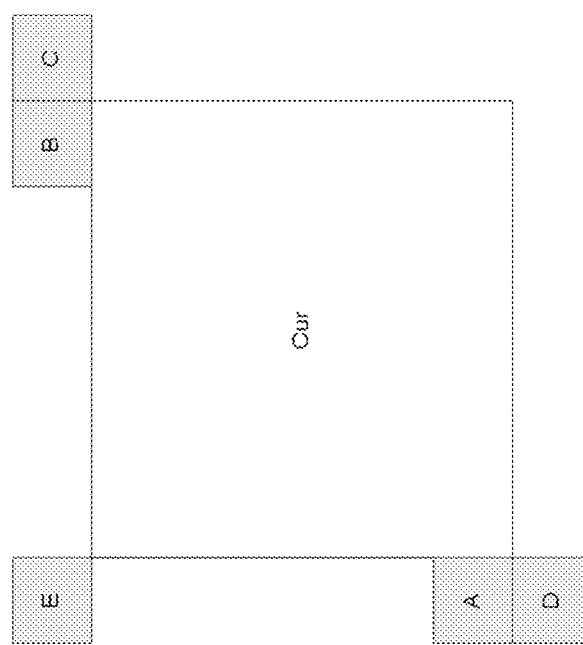

FIG. 23A shows an example of candidates for AF_MERGE in a five neighboring block scenario.

FIG. 23B shows an example flow of a CPMV predictor derivation process.

Figure 24:
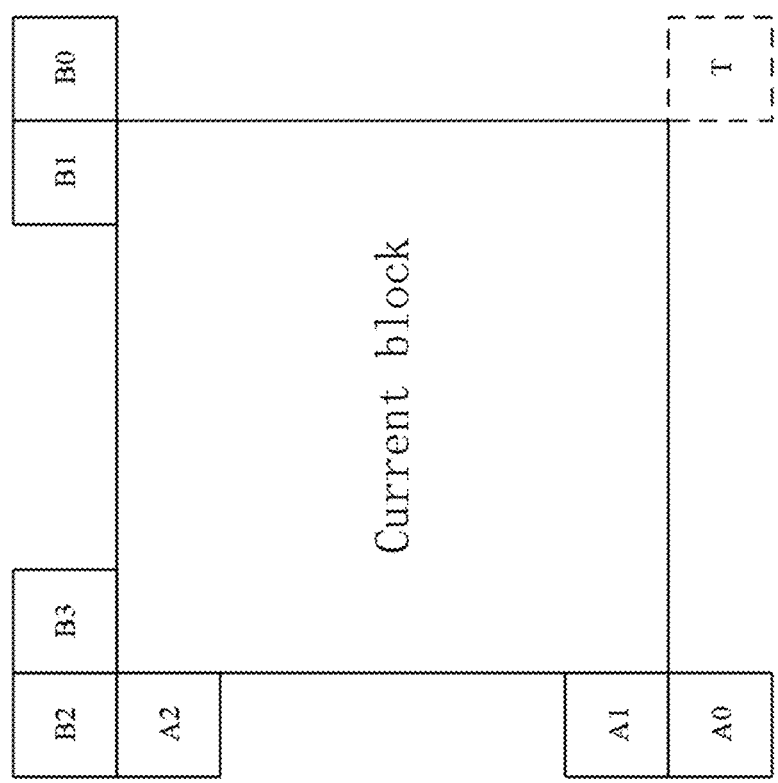

FIG. 24 shows example Candidates position for affine merge mode.

Figure 25:
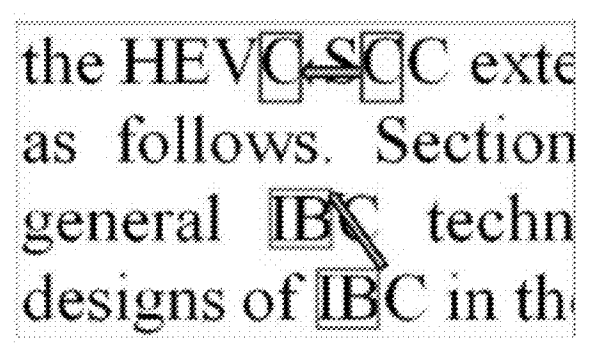

FIG. 25 shows an example of the intra block compensation.

Figure 26:
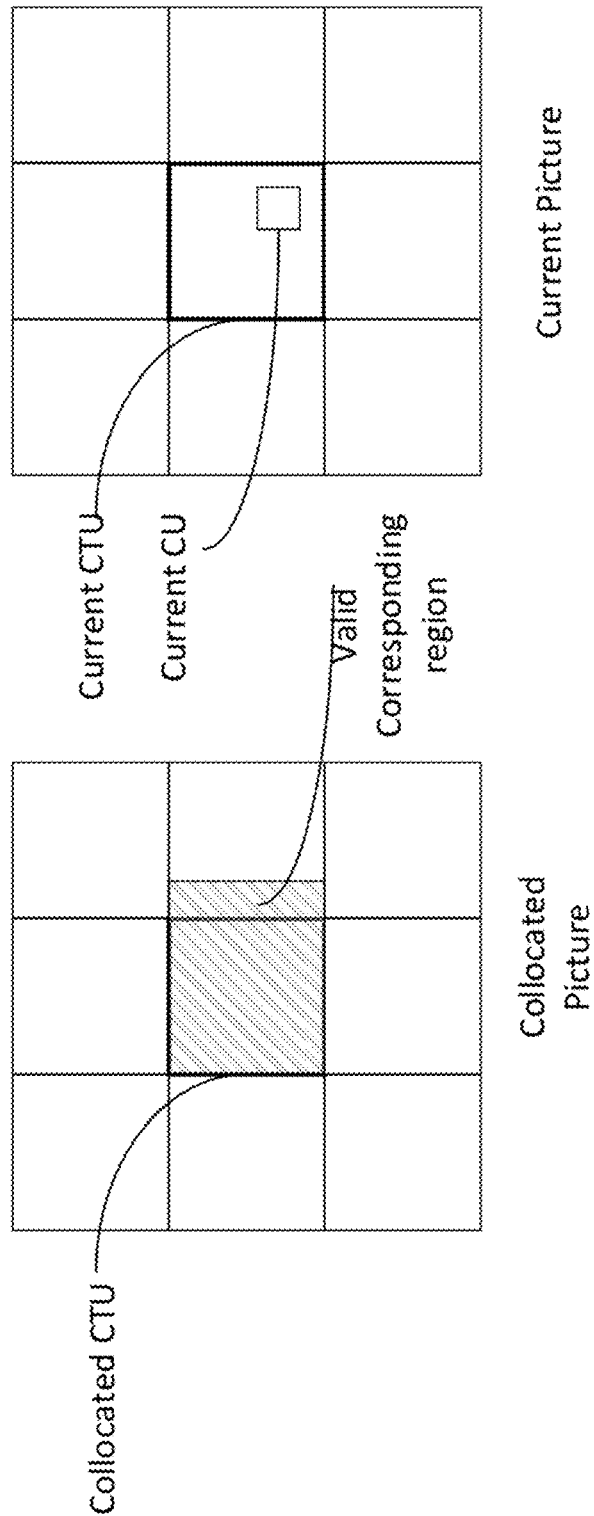

FIG. 26 shows an example of a valid corresponding region in the collocated picture.

Figure 27:
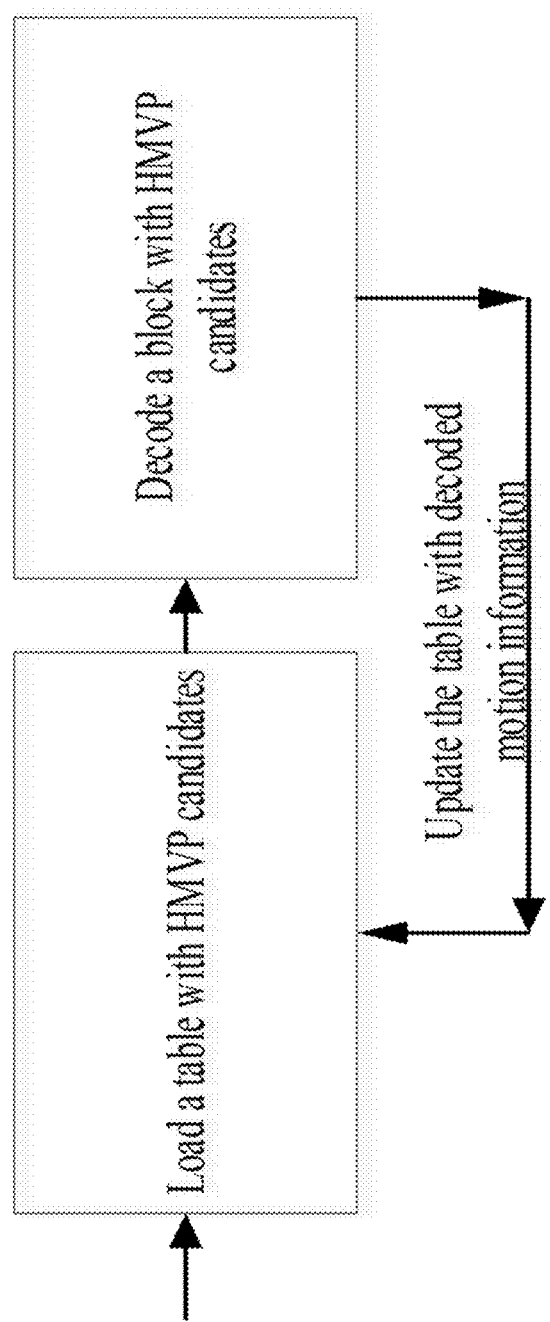

FIG. 27 shows an example coding flow for history based motion vector prediction (HMVP).

Figure 28:
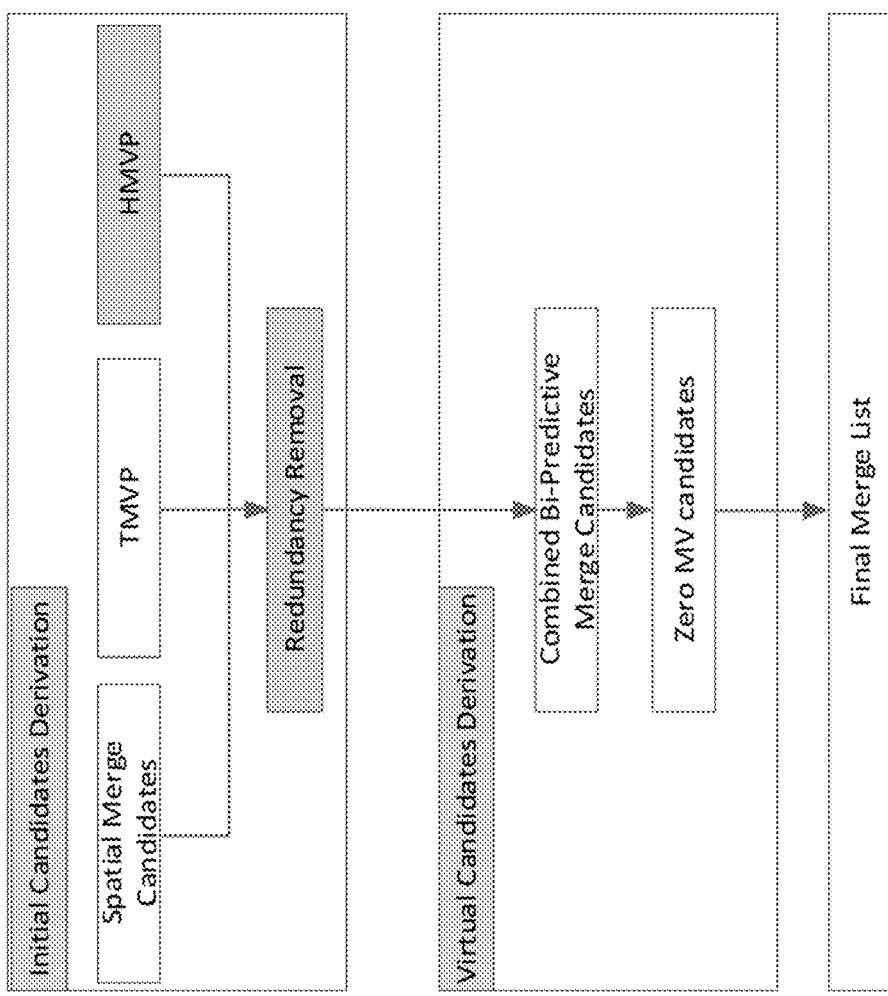

FIG. 28 depicts a modified merge candidate list construction process.

Figure 29:
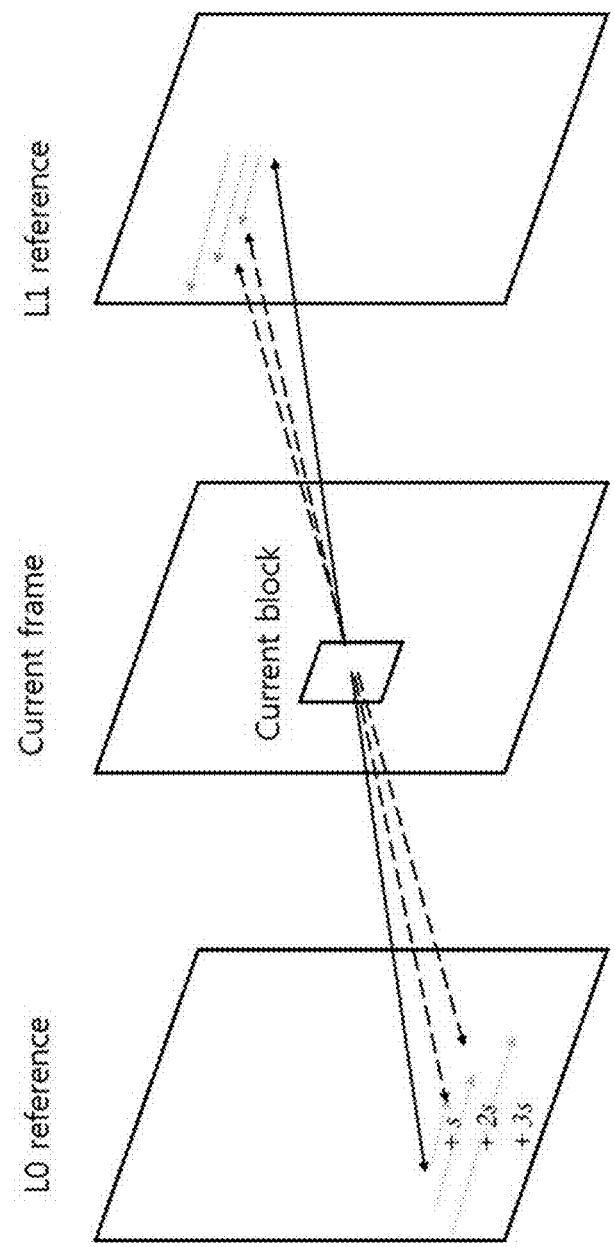

FIG. 29 shows an example of a UMVE search process.

Figure 30:
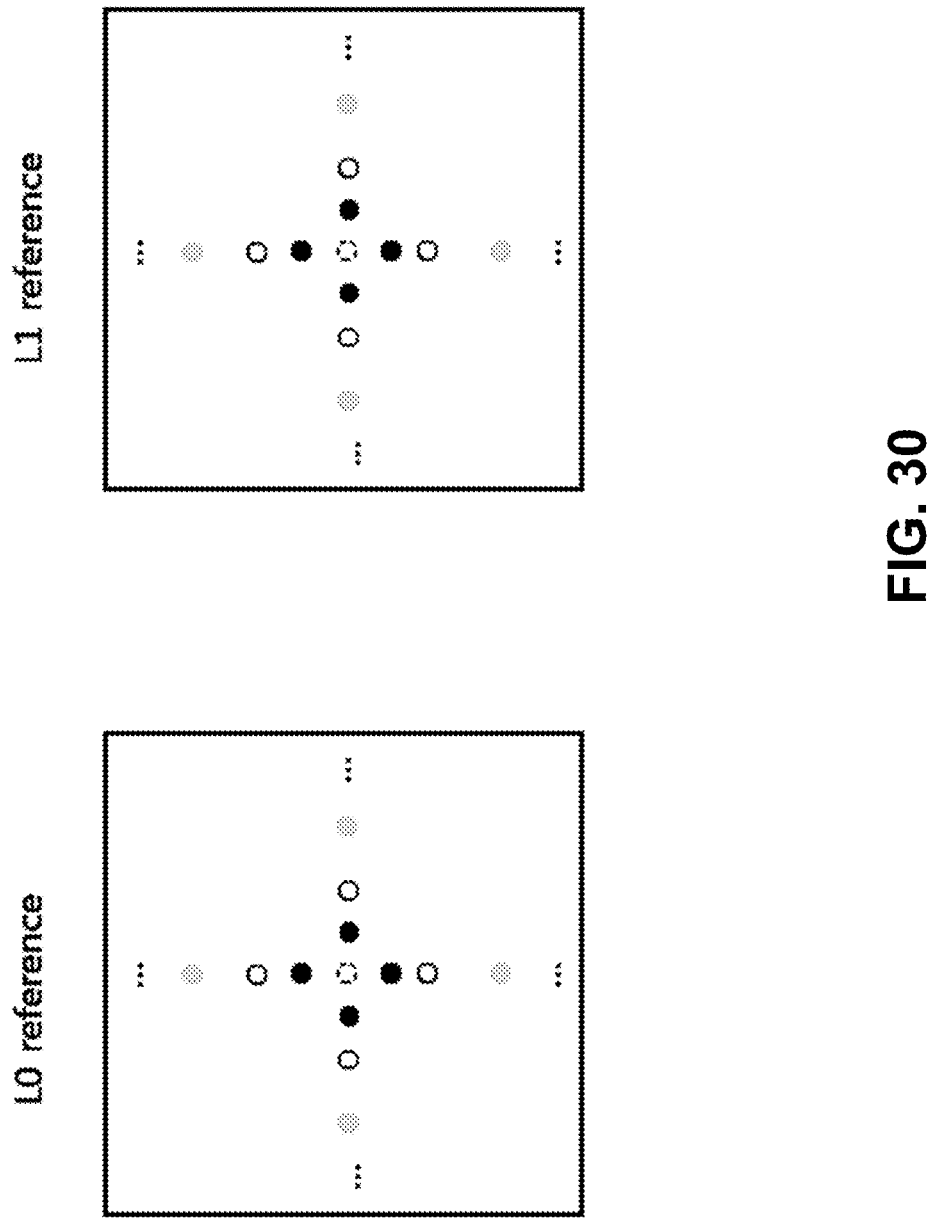

FIG. 30 shows an example of a UMVE search point.

Figure 31:
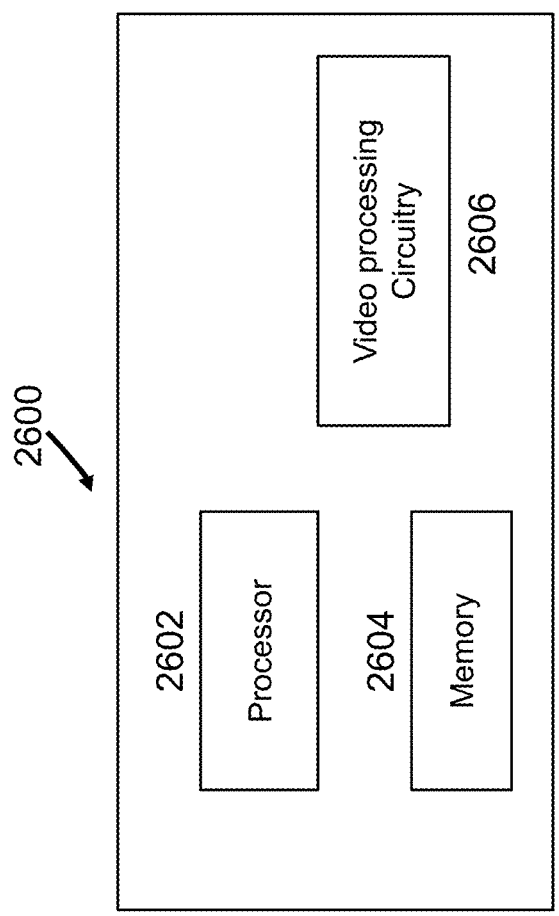

FIG. 31 is a block diagram of an example of a video processing apparatus.

Figure 32:
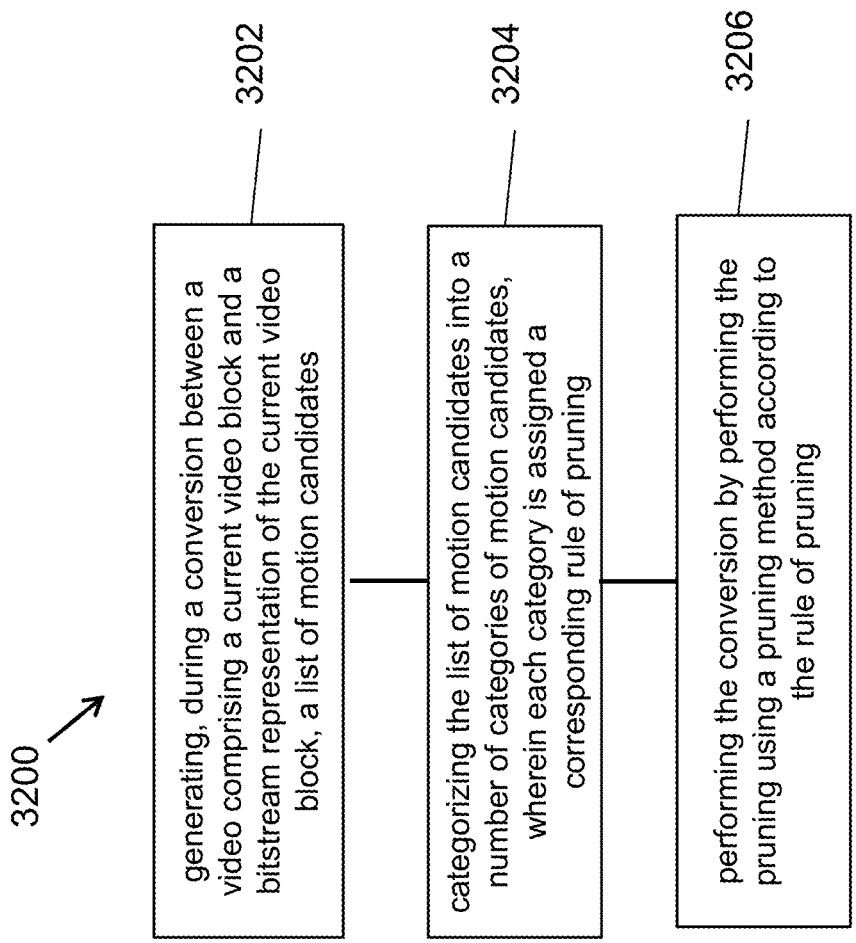

FIG. 32 is a flowchart for an example of a video processing method.

Figure 33:
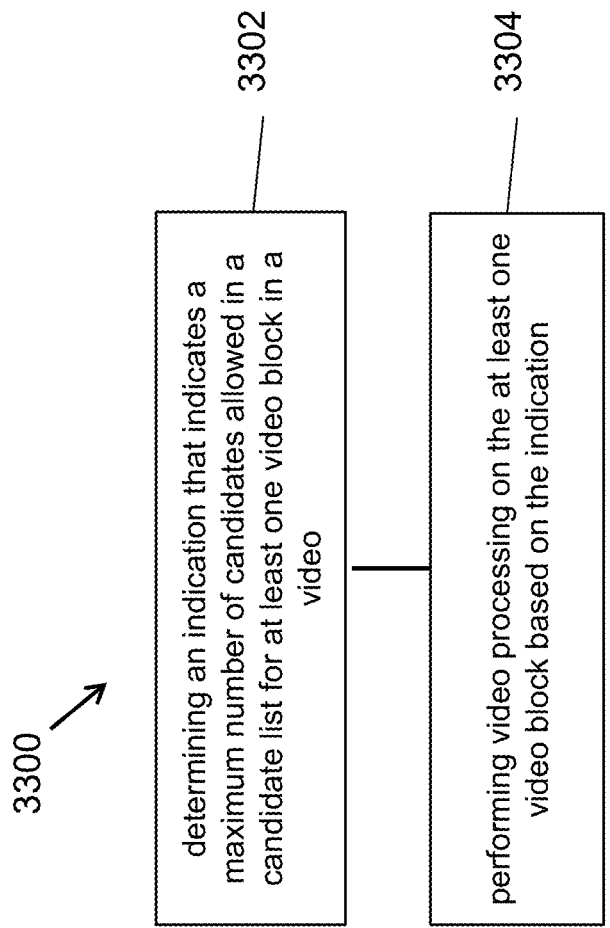

FIG. 33 is a flowchart for an example of a video processing method.

DETAILED DESCRIPTION

The present document provides various techniques that can be used by a decoder of video bitstreams to improve the quality of decompressed or decoded digital video or images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This patent document is related to video coding technologies. Specifically, it is related to motion vector coding in video coding. It may be applied to the existing video coding standard like HEVC, or the standard (Versatile Video Coding) to be finalized. It may be also applicable to future video coding standards or video codec.

In the present document, the term "video processing" may refer to video encoding, video decoding, video compression or video decompression. For example, video compression algorithms may be applied during conversion from pixel representation of a video to a corresponding bitstream representation or vice versa.

2. Introductory Remarks

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2 Merge Mode 2.1.2.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
  Step 1.1: Spatial candidates derivation
  Step 1.2: Redundancy check for spatial candidates
  Step 1.3: Temporal candidates derivation
Step 2: Virtual candidates insertion
  Step 2.1: Creation of combined bi-predictive candidates
  Step 2.2: Insertion of default motion candidates (zero motion candidates)

Figure 1:
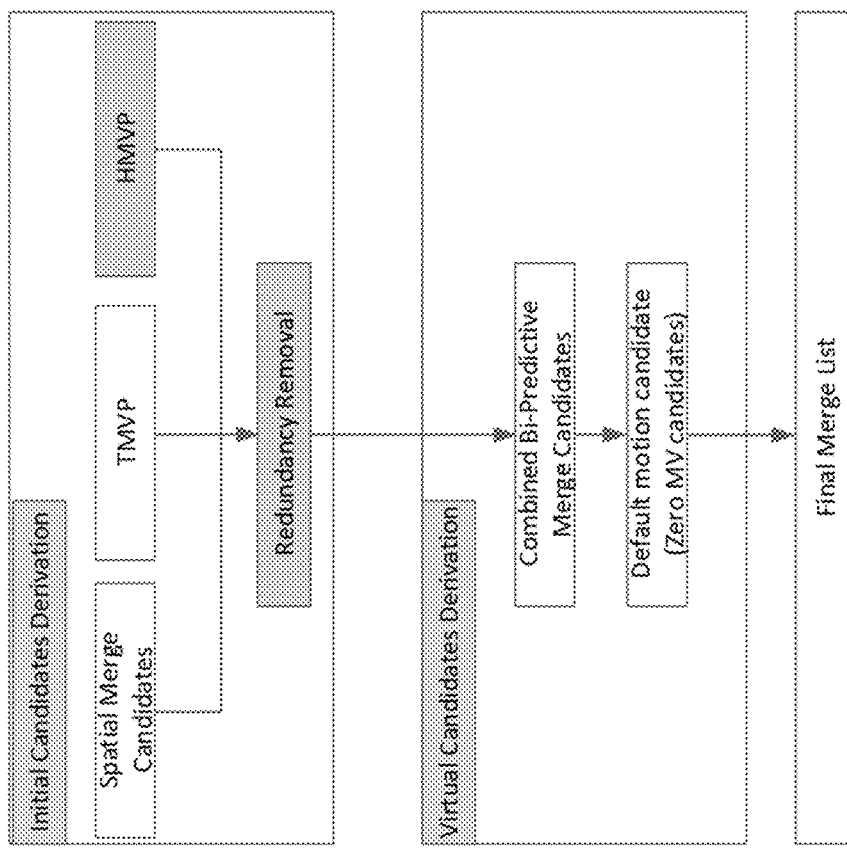
FIG. 1 shows an example of a derivation process for merge candidates list construction.

These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

FIG. 1 shows an example of a derivation process for merge candidates list construction.

2.1.2.2 Spatial Candidates Derivation

Figure 2:
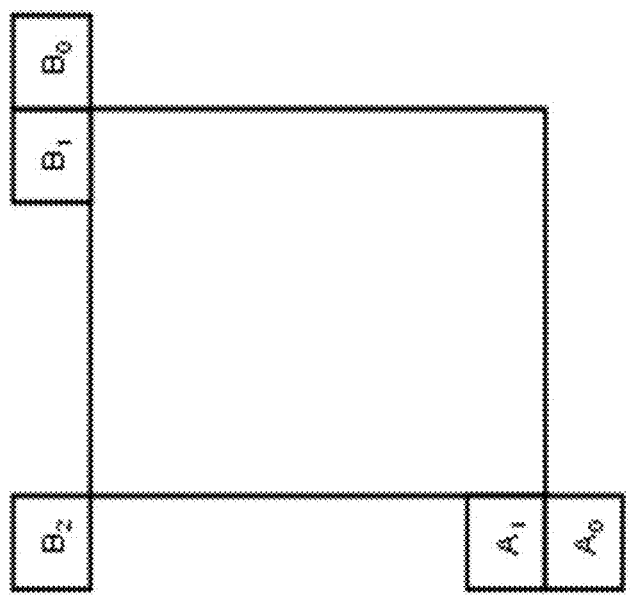
FIG. 2 shows example positions of spatial merge candidates.

In the derivation of spatial merge candidates, a maximum of four merge candidates are selected among candidates located in the positions depicted in FIG. 2.

FIG. 2 shows example positions of spatial merge candidates.

The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 3:
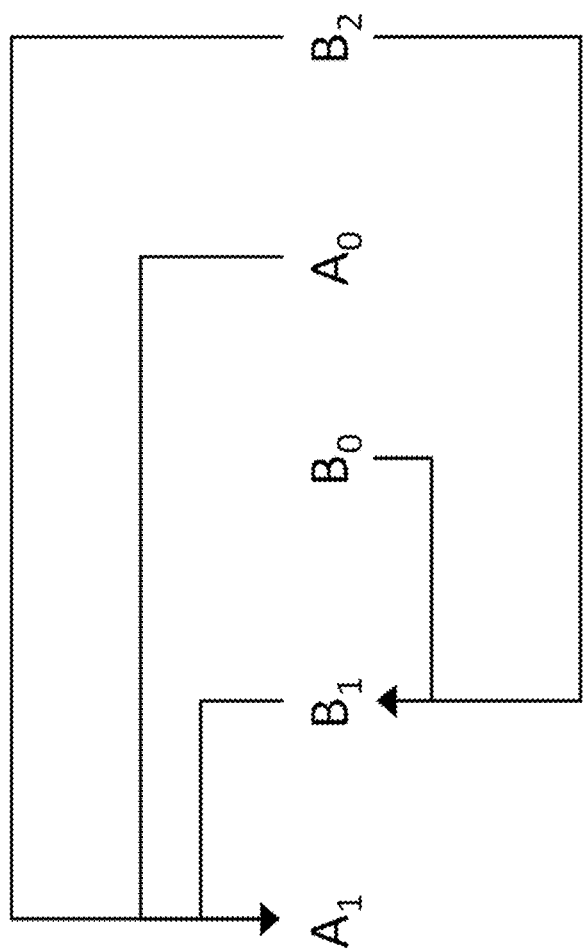
FIG. 3 shows examples of candidate pairs considered for redundancy check of spatial merge candidates.
Figures 4A, 4B:
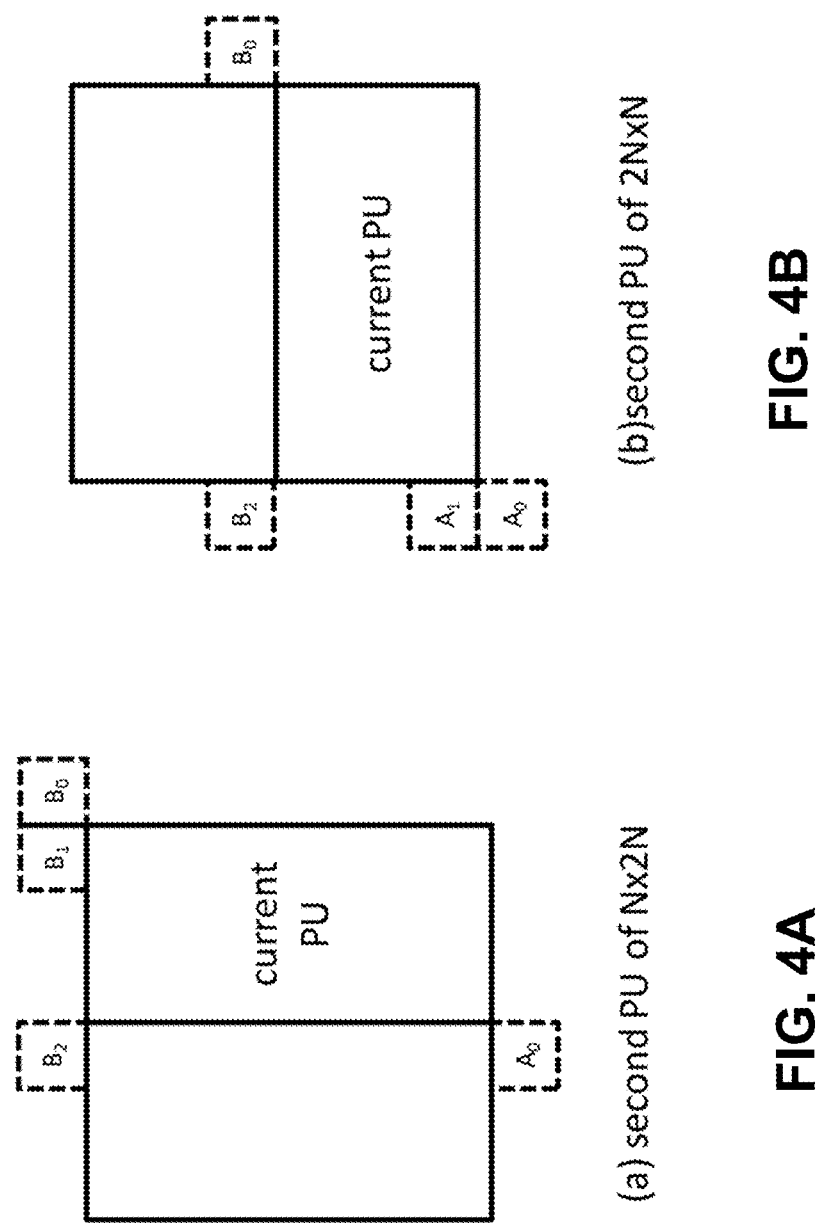
FIG. 4A-4B show example positions for the second PU of N×2N and 2N×N partitions.

FIG. 3 shows examples of candidate pairs considered for redundancy check of spatial merge candidates. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4A-4B depict the second PU for the case of N×2N and 2N×N, respectively. When the current PU is partitioned as N×2N, candidate at position A1 is not considered for list construction. In fact, by adding this candidate will lead to two prediction units having the same motion information, which is redundant to just have one PU in a coding unit. Similarly, position B1 is not considered when the current PU is partitioned as 2N×N.

FIG. 4A-4B show example positions for the second PU of N×2N and 2N×N partitions.

2.1.2.3 Temporal Candidates Derivation

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 5:
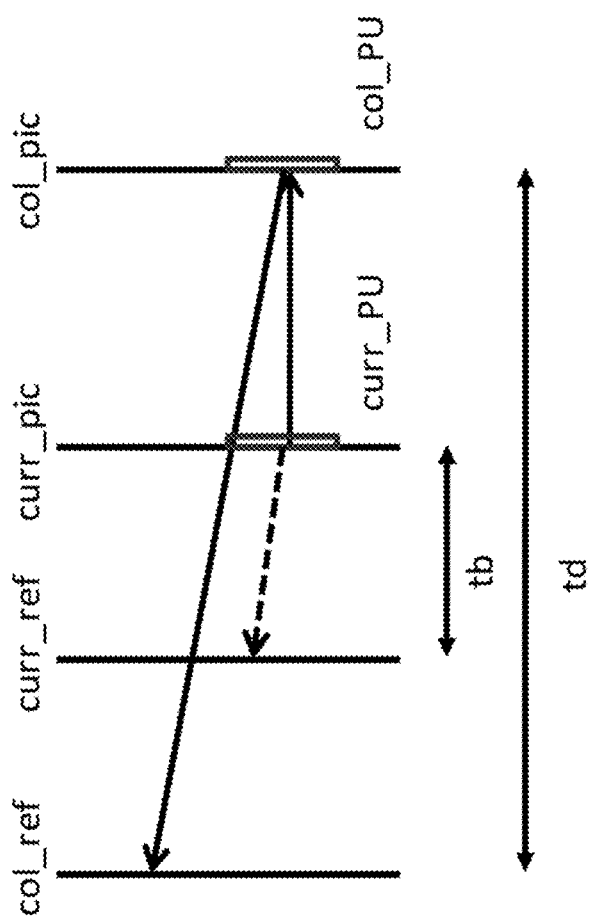
FIG. 5 is an illustration of motion vector scaling for temporal merge candidate.

FIG. 5 is an illustration of motion vector scaling for temporal merge candidate.

Figure 6:
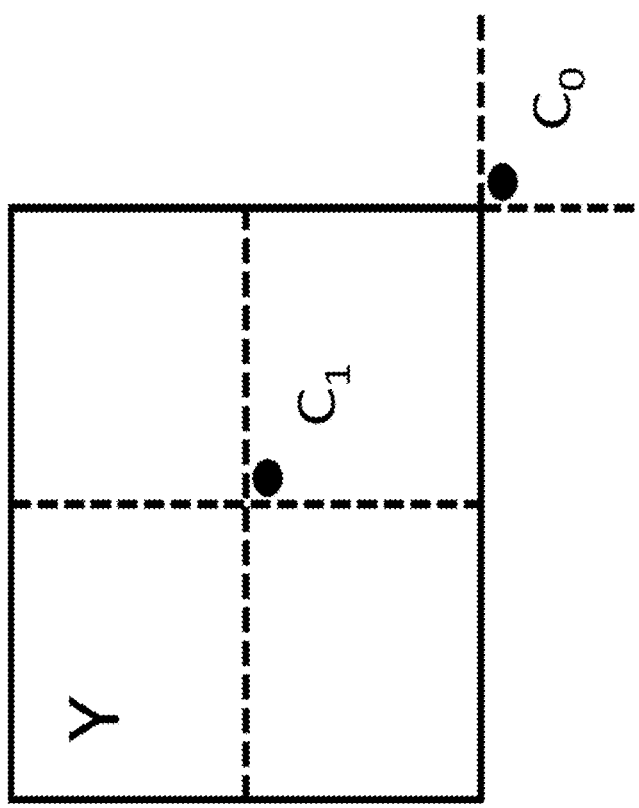
FIG. 6 shows candidate positions for temporal merge candidate, C0 and C1.

In the co-located PU (Y) belonging to the reference frame, the position for the temporal candidate is selected between candidates C0 and C1, as depicted FIG. 6. If PU at position C0 is not available, is intra coded, or is outside of the current coding tree unit (CTU aka. LCU, largest coding unit) row, position C1 is used. Otherwise, position C0 is used in the derivation of the temporal merge candidate.

FIG. 6 shows candidate positions for temporal merge candidate, C0 and C1.

2.1.2.4 Virtual Candidates Insertion

Besides spatial and temporal merge candidates, there are two additional types of virtual merge candidates: combined bi-predictive merge candidate and zero merge candidate.

2.1.2.4.1 Combined Bi-Predictive Merge Candidates

Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 7:
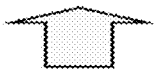
FIG. 7 shows example of combined bi-predictive merge candidate.

FIG. 7 shows example of combined bi-predictive merge candidate.

As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

2.1.2.4.2 Default Motion Candidates

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list.

More specifically, the following steps are performed in order till the merge list is full:

1. Set variable numRef to either number of reference picture associated with list 0 for P slice, or the minimum number of reference pictures in two lists for B slice;
2. Add non-repeated zero motion candidates:
   For variable i being 0 . . . numRef−1, add a default motion candidate with MV set to (0, 0) and reference picture index set to i for list 0 (if P slice), or for both lists (if B slice).
3. Add repeated zero motion candidates with MV set to (0, 0), reference picture index of list 0 set to 0 (if P slice) and reference picture indices of both lists set to 0 (if B slice).

2.1.3 AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.3.1 Derivation of AMVP Candidates

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates (with MV set to (0, 0)) is added to the list.

2.1.3.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
   (1) Same reference picture list, and same reference picture index (same POC)
   (2) Different reference picture list, but same reference picture (same POC)
Spatial scaling
   (3) Same reference picture list, but different reference picture (different POC)
   (4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

FIG. 9 is an example illustration of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3 Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2 Sub-CU Based Motion Vector Prediction Methods in JEM

In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

FIG. 10 shows an example of ATMVP motion prediction for a CU.

2.2.1 Alternative Temporal Motion Vector Prediction

In the alternative temporal motion vector prediction (ATMVP) method, the motion vectors temporal motion vector prediction (TMVP) is modified by fetching multiple sets of motion information (including motion vectors and reference indices) from blocks smaller than the current CU. In an example, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to 1-X) for each sub-CU.

2.2.2 Spatial-Temporal Motion Vector Prediction (STMVP)

In this method, the motion vectors of the sub-CUs are derived recursively, following raster scan order. FIG. 11 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

FIG. 11 shows example of one CU with four sub-blocks (A-D) and its neighbouring blocks (a-d).

2.2.3 Sub-CU Motion Prediction Mode Signalling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index is context coded by CABAC. While in HEVC, only the first bin is context coded and the remaining bins are context by-pass coded.

2.3 Inter Prediction Methods in VVC

There are several new coding tools for inter prediction improvement, such as Adaptive motion vector difference resolution (AMVR) for signaling MVD, affine prediction mode, Triangular prediction mode (TPM), multiple hypothesis intra mode (MHIntra, a.k.a., intra-inter) ATMVP, Generalized Bi-Prediction (GBI), Bi-directional Optical flow (BIO).

2.3.1 Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the VVC, a locally adaptive motion vector resolution (LAMVR) is introduced. In the VVC, MVD can be coded in units of quarter luma samples, integer luma samples or four luma samples (i.e., ¼-pel, 1-pel, 4-pel). The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

The encoding process is shown in FIG. 12. First, ¼ pel MV is tested and the RD cost is calculated and denoted as RDCost0, then integer MV is tested and the RD cost is denoted as RDCost1. If RDCost1<th*RDCost0 (wherein th is a positive value), then 4-pel MV is tested; otherwise, 4-pel MV is skipped. Basically, motion information and RD cost etc. are already known for ¼ pel MV when checking integer or 4-pel MV, which can be reused to speed up the encoding process of integer or 4-pel MV.

FIG. 12 shows an example flowchart of encoding with different MV precision.

2.3.2 Triangular Prediction Mode

The concept of the triangular prediction mode (TPM) is to introduce a new triangular partition for motion compensated prediction. As shown in FIG. 13A-13B, it splits a CU into two triangular prediction units, in either diagonal or inverse diagonal direction. Each triangular prediction unit in the CU is inter-predicted using its own uni-prediction motion vector and reference frame index which are derived from a single uni-prediction candidate list. An adaptive weighting process is performed to the diagonal edge after predicting the triangular prediction units. Then, the transform and quantization process are applied to the whole CU. It is noted that this mode is only applied to merge mode (note: skip mode is treated as a special merge mode).

FIG. 13 A shows a 135 degree partition type (splitting from top-left corner to bottom-right corner). FIG. 13B shows a 45 degree splitting patterns.

2.3.2.1 Uni-Prediction Candidate List for TPM

FIG. 14 shows position of the neighboring blocks. This section, and other discussion in the present document with respect to TPM, is generally applicable to any geometry partition mode, and is specifically illustrated with reference to TPM mode.

The uni-prediction candidate list, named TPM motion candidate list, consists of five uni-prediction motion vector candidates. It is derived from seven neighboring blocks including five spatial neighboring blocks (1 to 5) and two temporal co-located blocks (6 to 7), as shown in FIG. 14. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list. Motion candidates added in this list for TPM are called TPM candidates, motion information derived from spatial/temporal blocks are called regular motion candidates.

More specifically, the following steps are involved:
1) Obtain regular motion candidates from $A_1$, $B_1$, $B_0$, $A_0$, $B_2$, Col and Col2 (corresponding to block 1-7 in FIG. 14) with full pruning operations when adding a regular motion candidate from spatial neighboring blocks.
2) Set variable numCurrMrgCand=0
3) For each regular motion candidates derived from $A_1$, $B_1$, $B_0$, $A_0$, $B_2$, Col and Col2, if not pruned and numCurrMrgCand is less than 5, if the regular motion candidate is uni-prediction (either from List 0 or List 1), it is directly added to the merge list as an TPM candidate with numCurrMrgCand increased by 1. Such a TPM candidate is named 'originally uni-predicted candidate'.
   Full pruning is applied.
4) For each motion candidates derived from $A_1$, $B_1$, $B_0$, $A_0$, $B_2$, Col and Col2, if not pruned, and numCurrMrgCand is less than 5, if the regular motion candidate is bi-prediction, the motion information from List 0 is added to the TPM merge list (that is, modified to be uni-prediction from List 0) as a new TPM candidate and numCurrMrgCand increased by 1. Such a TPM candidate is named 'Truncated List0-predicted candidate'.
   Full pruning is applied.
5) For each motion candidates derived from $A_1$, $B_1$, $B_0$, $A_0$, $B_2$, Col and Col2, if not pruned, and numCurrMrgCand is less than 5, if the regular motion candidate is bi-prediction, the motion information from List 1 is added to the TPM merge list (that is, modified to be uni-prediction from List 1) and numCurrMrgCand increased by 1. Such a TPM candidate is named 'Truncated List1-predicted candidate'.
   Full pruning is applied.
6) For each motion candidates derived from $A_1$, $B_1$, $B_0$, $A_0$, $B_2$, Col and Col2, if not pruned, and numCurrMrgCand is less than 5, if the regular motion candidate is bi-prediction,
   If List 0 reference picture's slice QP is smaller than List 1 reference picture's slice QP, the motion information of List 1 is firstly scaled to List 0 reference picture, and the average of the two MVs (one is from original List 0, and the other is the scaled MV from List 1) is added to the TPM merge list, such a candidate is called averaged uni-prediction from List 0 motion candidate and numCurrMrgCand increased by 1.
   Otherwise, the motion information of List 0 is firstly scaled to List 1 reference picture, and the average of the two MVs (one is from original List 1, and the other is the scaled MV from List 0) is added to the TPM merge list, such a TPM candidate is called averaged uni-prediction from List 1 motion candidate and numCurrMrgCand increased by 1.
   Full pruning is applied.
7) If numCurrMrgCand is less than 5, zero motion vector candidates are added without pruning.
   a. Set variable numRef to either number of reference picture associated with list 0 for P slice, or the minimum number of reference pictures in two lists for B slice;

b. Add non-repeated zero motion candidates:
   i. For variable i being 0 . . . numRef−1, add two TPM candidates in order:
      a default motion candidate with MV set to (0, 0) and reference picture index set to i for list 0
      a default motion candidate with MV set to (0, 0) and reference picture index set to i for list 1

When inserting a candidate to the list, if it has to be compared to all previously added candidates to see whether it is identical to one of them, such a process is called full pruning.

2.3.2.2 Adaptive Weighting Process

After predicting each triangular prediction unit, an adaptive weighting process is applied to the diagonal edge between the two triangular prediction units to derive the final prediction for the whole CU. Two weighting factor groups are defined as follows:

$1^{st}$ weighting factor group: {7/8, 6/8, 4/8, 2/8, 1/8} and {7/8, 4/8, 1/8} are used for the luminance and the chrominance samples, respectively;

$2^{nd}$ weighting factor group: {7/8, 6/8, 5/8, 4/8, 3/8, 2/8, 1/8} and {6/8, 4/8, 2/8} are used for the luminance and the chrominance samples, respectively.

Weighting factor group is selected based on the comparison of the motion vectors of two triangular prediction units. The $2^{nd}$ weighting factor group is used when any one of the following condition is true:
   the reference pictures of the two triangular prediction units are different from each other
   absolute value of the difference of two motion vectors' horizontal values is larger than 16 pixels.
   absolute value of the difference of two motion vectors' vertical values is larger than 16 pixels.

Otherwise, the 1st weighting factor group is used. An example is shown in FIG. 15.

FIG. 15 shows an example of a CU applying the 1st weighting factor group.

2.3.2.3 Motion Vector Storage

The motion vectors (Mv1 and Mv2 in FIGS. 16A-16B) of the triangular prediction units are stored in 4×4 grids. For each 4×4 grid, either uni-prediction or bi-prediction motion vector is stored depending on the position of the 4×4 grid in the CU. As shown in FIG. 16A-16B, uni-prediction motion vector, either Mv1 or Mv2, is stored for the 4×4 grid located in the non-weighted area (that is, not located at the diagonal edge). On the other hand, a bi-prediction motion vector is stored for the 4×4 grid located in the weighted area. The bi-prediction motion vector is derived from Mv1 and Mv2 according to the following rules:

1) In the case that MV1 and MV2 have motion vector from different directions (L0 or L1), MV1 and MV2 are simply combined to form the bi-prediction motion vector.
2) In the case that both Mv1 and MV2 are from the same L0 (or L1) direction,
   If the reference picture of MV2 is the same as a picture in the L1 (or L0) reference picture list, MV2 is scaled to the picture. Mv1 and the scaled MV2 are combined to form the bi-prediction motion vector.
   If the reference picture of Mv1 is the same as a picture in the L1 (or L0) reference picture list, Mv1 is scaled to the picture. The scaled Mv1 and MV2 are combined to form the bi-prediction motion vector.
   Otherwise, only Mv1 is stored for the weighted area.

FIG. 16A-16B show examples of motion vector storage.

2.3.2.4 Signaling of Triangular Prediction Mode (TPM)

One bit flag to indicate whether TPM is used may be firstly signaled at CU level. Afterwards, the indications of two splitting patterns (as depicted in FIG. 13A-13B), and selected merge indices for each of the two partitions are further signaled.

When any one of the following condition is true for a CU, signaling of the flag is skipped and TPM is not applied.
   If the SPS flag of TPM usage is false
   If the slice type of the slice covering current block is not a B slice
   If the current block size is smaller than 64
   If the current block is coded with affine mode 2.3.2.4.1 Signaling of TPM Flag Let's denote one luma block's width and height by W and H, respectively. If W*H<64, triangular prediction mode is disabled.

When one block is coded with affine mode, triangular prediction mode is also disabled.

When one block is coded with merge mode, one bit flag may be signaled to indicate whether the triangular prediction mode is enabled or disabled for the block.

The flag is coded with 3 contexts, based on the following equation:

$$Ctx\ index=((\text{left block } L \text{ available}\&\&L \text{ is coded with TPM?})1:0)+((\text{Above block } A \text{ available}\&\&A \text{ is coded with TPM?})1:0);$$

FIG. 17 shows an example of neighboring blocks (A and L) used for context selection in TPM flag coding.

2.3.2.4.2 Signaling of an Indication of Two Splitting Patterns (as Depicted in FIGS. 13A-13B), and Selected Merge Indices for Each of the Two Partitions It is noted that splitting patterns, merge indices of two partitions are jointly coded. In an example, it is restricted that the two partitions couldn't use the same reference index. Therefore, there are 2 (splitting patterns)*N(maximum number of merge candidates)*(N−1) possibilities wherein N is set to 5. One indication is coded and the mapping between the splitting patterns, two merge indices and coded indication are derived from the array defined below:

const uint8_t g_TriangleCombination[TRIANGLE_MAX_NUM_CANDS][3]={{0, 1, 0}, {1, 0, 1}, {1, 0, 2}, {0, 0, 1}, {0, 2, 0}, {1, 0, 3}, {1, 0, 4}, {1, 1, 0}, {0, 3, 0}, {0, 4, 0}, {0, 0, 2}, {0, 1, 2}, {1, 1, 2}, {0, 0, 4}, {0, 0, 3}, {0, 1, 3}, {0, 1, 4}, {1, 1, 4}, {1, 1, 3}, {1, 2, 1}, {1, 2, 0}, {0, 2, 1}, {0, 4, 3}, {1, 3, 0}, {1, 3, 2}, {1, 3, 4}, {1, 4, 0}, {1, 3, 1}, {1, 2, 3}, {1, 4, 1}, {0, 4, 1}, {0, 2, 3}, {1, 4, 2}, {0, 3, 2}, {1, 4, 3}, {0, 3, 1}, {0, 2, 4}, {1, 2, 4}, {0, 4, 2}, {0, 3, 4}};

splitting patterns (45 degree or 135 degree)=g_TriangleCombination[signaled indication][0];

Merge index of candidate A=g_TriangleCombination[signaled indication][1];

Merge index of candidate B=g_TriangleCombination[signaled indication][2];

Once the two motion candidates A and B are derived, the two partitions' (PU1 and PU2) motion information could be set either from A or B. Whether PU1 uses the motion information of merge candidate A or B is dependent on the prediction directions of the two motion candidates. Table 1 shows the relationship between two derived motion candidates A and B, with the two partitions.

TABLE 1

Derivation of partitions' motion information from derived two merge candidates (A, B)

| Prediction direction of A | Prediction direction of B | PU1's motion information | PU2's motion information |
|---|---|---|---|
| L0 | L0 | A (L0) | B (L0) |
| L1 | L1 | B (L1) | A (L1) |
| L0 | L1 | A (L0) | B (L1) |
| L1 | L0 | B (L0) | A (L1) |

2.3.2.4.3 Entropy Coding of the Indication (Denoted by merge_triangle_idx)

merge_triangle_idx is within the range [0, 39], inclusively. K-th order Exponential Golomb (EG) code is used for binarization of merge_triangle_idx wherein K is set to 1.
K-th Order EG To encode larger numbers in fewer bits (at the expense of using more bits to encode smaller numbers), this can be generalized using a nonnegative integer parameter k. To encode a nonnegative integer x in an order-k exp-Golomb code:
1. Encode $\lfloor x/2^k \rfloor$ using order-0 exp-Golomb code described above, then
2. Encode x mod $2^k$ in binary

TABLE 2

Exp-Golomb-k coding examples

| x | k = 0 | k = 1 | k = 2 |
|---|---|---|---|
| 0 | 1 | 10 | 100 |
| 1 | 010 | 11 | 101 |
| 2 | 011 | 0100 | 110 |
| 3 | 00100 | 0101 | 111 |
| 4 | 00101 | 0110 | 01000 |
| 5 | 00110 | 0111 | 01001 |
| 6 | 00111 | 001000 | 01010 |
| 7 | 0001000 | 001001 | 01011 |
| 8 | 0001001 | 001010 | 01100 |
| 9 | 0001010 | 001011 | 01101 |
| 10 | 0001011 | 001100 | 01110 |
| 11 | 0001100 | 001101 | 01111 |
| 12 | 0001101 | 001110 | 0010000 |
| 13 | 0001110 | 001111 | 0010001 |
| 14 | 0001111 | 00010000 | 0010010 |
| 15 | 000010000 | 00010001 | 0010011 |
| 16 | 000010001 | 00010010 | 0010100 |
| 17 | 000010010 | 00010011 | 0010101 |
| 18 | 000010011 | 00010100 | 0010110 |
| 19 | 000010100 | 00010101 | 0010111 |

2.3.3 Affine Motion Compensation Prediction

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIG. 18A-18B, the affine motion field of the block is described by two control point motion vectors (CPMVs) for the 4-parameter affine model and 3 CPMVs for the 6-parameter affine model.

FIG. 18A-18B show respectively 4 and 6 parameter simplified affine motion models.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad (1)$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad (2)$$

where $(mv^h_0, mv^h_0)$ is motion vector of the top-left corner control point, and $(mv^h_1, mv^h_1)$ is motion vector of the top-right corner control point and $(mv^h_2, mv^h_2)$ is motion vector of the bottom-left corner control point, all of the three motion vectors are called control point motion vectors (CPMV), (x, y) represents the coordinate of a representative point relative to the top-left sample within current block and $(mv^h(x,y), mv^v(x,y))$ is the motion vector derived for a sample located at (x, y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 19, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

FIG. 19 shows an example of Affine MVF per sub-block.

After MCP, the high accuracy motion vector of each sub-block is rounded and saved as the same accuracy as the normal motion vector.

2.3.3.1 Signaling of Affine Prediction

Similar to the translational motion model, there are also two modes for signaling the side information due affine prediction. They are AFFINE_INTER and AFFINE_MERGE modes.

2.3.3.2 AF_INTER Mode

For CUs with both width and height larger than 8, AF_INTER mode can be applied. An affine flag in CU level is signalled in the bitstream to indicate whether AF_INTER mode is used.

In this mode, for each reference picture list (List 0 or List 1), an affine AMVP candidate list is constructed with three types of affine motion predictors in the following order, wherein each candidate includes the estimated CPMVs of the current block. The differences of the best CPMVs found at the encoder side (such as $mv_0$ $mv_1$ $mv_2$ in FIG. 22) and the estimated CPMVs are signalled. In addition, the index of affine AMVP candidate from which the estimated CPMVs are derived is further signalled.

1) Inherited Affine Motion Predictors

The checking order is similar to that of spatial MVPs in HEVC AMVP list construction. First, a left inherited affine motion predictor is derived from the first block in {A1, A0} that is affine coded and has the same reference picture as in current block. Second, an above inherited affine motion predictor is derived from the first block in {B1, B0, B2} that is affine coded and has the same reference picture as in current block. The five blocks A1, A0, B1, B0, B2 are depicted in FIG. 21.

Once a neighboring block is found to be coded with affine mode, the CPMVs of the coding unit covering the neighboring block are used to derive predictors of CPMVs of current block. For example, if A1 is coded with non-affine mode and A0 is coded with 4-parameter affine mode, the left inherited affine MV predictor will be derived from A0. In this case, the CPMVs of a CU covering A0, as denoted by $MV_0^N$ for the top-left CPMV and $MV_1^N$ for the top-right CPMV in FIG. 23B are utilized to derive the estimated CPMVs of current block, denoted by $MV_0^C$, $MV_1^C$, $MV_2^C$ for the top-left (with coordinate (x0, y0)), top-right (with coordinate (x1, y1)) and bottom-right positions (with coordinate (x2, y2)) of current block.

2) Constructed Affine Motion Predictors

A constructed affine motion predictor consists of control-point motion vectors (CPMVs) that are derived from neighboring inter coded blocks, as shown in FIG. 22, that have the same reference picture. If the current affine motion model is 4-paramter affine, the number of CPMVs is 2, otherwise if the current affine motion model is 6-parameter affine, the number of CPMVs is 3. The top-left CPMV $\overline{mv}_0$ is derived by the MV at the first block in the group {A, B, C} that is inter coded and has the same reference picture as in current block. The top-right CPMV $\overline{mv}_1$ is derived by the MV at the first block in the group {D, E} that is inter coded and has the same reference picture as in current block. The bottom-left CPMV $\overline{mv}_2$ is derived by the MV at the first block in the group {F, G} that is inter coded and has the same reference picture as in current block.

If the current affine motion model is 4-parameter affine, then a constructed affine motion predictor is inserted into the candidate list only if both $\overline{mv}_0$ and $\overline{mv}_1$ are founded, that is, $\overline{mv}_0$ and $\overline{mv}_1$ are used as the estimated CPMVs for top-left (with coordinate (x0, y0)), top-right (with coordinate (x1, y1)) positions of current block.

If the current affine motion model is 6-parameter affine, then a constructed affine motion predictor is inserted into the candidate list only if $\overline{mv}_0$, $\overline{mv}_1$ and $\overline{mv}_2$ are all founded, that is, $\overline{mv}_0$, $\overline{mv}_1$ and $\overline{mv}_2$ are used as the estimated CPMVs for top-left (with coordinate (x0, y0)), top-right (with coordinate (x1, y1)) and bottom-right (with coordinate (x2, y2)) positions of current block.

No pruning process is applied when inserting a constructed affine motion predictor into the candidate list.

3) Normal AMVP Motion Predictors

The following applies until the number of affine motion predictors reaches the maximum.

1) Derive an affine motion predictor by setting all CPMVs equal to $\overline{mv}_2$ if available.
2) Derive an affine motion predictor by setting all CPMVs equal to $\overline{mv}_1$ if available.
3) Derive an affine motion predictor by setting all CPMVs equal to $\overline{mv}_0$ if available.
4) Derive an affine motion predictor by setting all CPMVs equal to HEVC TMVP if available.
5) Derive an affine motion predictor by setting all CPMVs to zero MV.

Note that $\overline{mv}_i$ is already derived in constructed affine motion predictor.

FIG. 20A shows an example of a 4-paramenter affine model. FIG. 20B shows an example of a 6-parameter affine model.

FIG. 21 shows an example of an MVP for AF_INTER for inherited affine candidates.

FIG. 22 shows example MVP for AF_INTER for constructed affine candidates.

In AF_INTER mode, when ⅘-parameter affine mode is used, ⅔ control points are required, and therefore ⅔ MVD needs to be coded for these control points, as shown in FIG. 20A-20B. In an example, it is proposed to derive the MV as follows, i.e., $mvd_1$ and $mvd_2$ are predicted from $mvd_0$.

$$mv_0 = \overline{mv}_0 + mvd_0$$

$$mv_1 = \overline{mv}_1 + mvd_1 mvd_0$$

$$mv_2 = \overline{mv}_2 + mvd_2 + mvd_0$$

Wherein $\overline{mv}_i$, $mvd_i$ and $mv_i$ are the predicted motion vector, motion vector difference and motion vector of the top-left pixel (i=0), top-right pixel (i=1) or left-bottom pixel (i=2) respectively, as shown in FIG. 20B. Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.3.3.3 AF_MERGE Mode

When a CU is applied in AF_MERGE mode, it gets the first block coded with affine mode from the valid neighbour reconstructed blocks. And the selection order for the candidate block is from left, above, above right, left bottom to above left as shown in FIG. 23A (denoted by A, B, C, D, E in order). For example, if the neighbour left bottom block is coded in affine mode as denoted by A0 in FIG. 23B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$. Sub-block (e.g. 4×4 block in VTM) located at the top-left corner stores mv0, the sub-block located at the top-right corner stores mv1 if the current block is affine coded. If the current block is coded with the 6-parameter affine model, the sub-block located at the bottom-left corner stores mv2; otherwise (with the 4-parameter affine model), LB stores mv2'. Other sub-blocks stores the MVs used for MC.

After the CPMV of the current CU $mv_0^C$, $mv_1^C$ and $mv_2^C$ are derived, according to the simplified affine motion model Equation (1) and (2), the MVF of the current CU is generated. In order to identify whether the current CU is coded with AF_MERGE mode, an affine flag is signalled in the bitstream when there is at least one neighbour block is coded in affine mode.

FIG. 23A shows an example of candidates for AF_MERGE in a five neighboring block scenario. FIG. 23B shows an example flow of a CPMV predictor derivation process.

In examples, an affine merge candidate list is constructed with following steps:

1) Insert Inherited Affine Candidates

Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B2}.

2) Insert Constructed Affine Candidates

If the number of candidates in affine merge candidate list is less than MaxNumAffineCand (e.g., 5), constructed affine candidates are inserted into the candidate list. Constructed affine candidate means the candidate is constructed by combining the neighbor motion information of each control point.

a) The motion information for the control points is derived firstly from the specified spatial neighbors and temporal neighbor shown in FIG. 24. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

FIG. 24 shows example Candidates position for affine merge mode.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.

For CP3, the checking priority is A1→A0.

For CP4, T is used.

b) Secondly, the combinations of controls points are used to construct an affine merge candidate.

I. Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

II. Motion information of two control points are needed to construct a 4-parameter affine candidate. The two control points can be selected from one of the two combinations ({CP1, CP2}, {CP1, CP3}). The two combinations will be converted to a 4-parameter motion model represented by top-left and top-right control points.

III. The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3} i. For each combination, the reference indices of list X for each CP are checked, if they are all the same, then this combination has valid CPMVs for list X. If the combination does not have valid CPMVs for both list 0 and list 1, then this combination is marked as invalid. Otherwise, it is valid, and the CPMVs are put into the sub-block merge list.

3) Padding with zero motion vectors

Repeated candidates: If the number of candidates in affine merge candidate list is less than 5, zero motion vectors with zero reference indices for list 0 (if P slice), and for both lists (if B slice), affine model type set to 4-parameter are insert into the candidate list, until the list is full.

More specifically, for the sub-block merge candidate list, a 4-parameter merge candidate with MVs set to (0, 0) and prediction direction set to uni-prediction from list 0 (for P slice) and bi-prediction (for B slice).

2.3.4 Current Picture Referencing

Intra block copy (IBC, or intra picture block compensation), also named current picture referencing (CPR) was adopted in HEVC screen content coding extensions (SCC). This tool is very efficient for coding of screen content video in that repeated patterns in text and graphics rich content occur frequently within the same picture. Having a previously reconstructed block with equal or similar pattern as a predictor can effectively reduce the prediction error and therefore improve coding efficiency. An example of the intra block compensation is illustrated in FIG. 25.

Similar to the design of CRP in HEVC SCC, In VVC, The use of the IBC mode is signaled at both sequence and picture level. When the IBC mode is enabled at sequence parameter set (SPS), it can be enabled at picture level. When the IBC mode is enabled at picture level, the current reconstructed picture is treated as a reference picture. Therefore, no syntax change on block level is needed on top of the existing VVC inter mode to signal the use of the IBC mode.

Main features:

It is treated as a normal inter mode. Therefore, merge and skip modes are also available for the IBC mode. The merge candidate list construction is unified, containing merge candidates from the neighboring positions that are either coded in the IBC mode or the HEVC inter mode. Depending on the selected merge index, the current block under merge or skip mode can merge into either an IBC mode coded neighbor or otherwise an normal inter mode coded one with different pictures as reference pictures.

Block vector prediction and coding schemes for the IBC mode reuse the schemes used for motion vector prediction and coding in the HEVC inter mode (AMVP and MVD coding).

The motion vector for the IBC mode, also referred as block vector, is coded with integer-pel precision, but stored in memory in 1/16-pel precision after decoding as quarter-pel precision is required in interpolation and deblocking stages. When used in motion vector prediction for the IBC mode, the stored vector predictor will be right shifted by 4.

Search range: it is restricted to be within the current CTU.

CPR is disallowed when affine mode/triangular mode/GBI/weighted prediction is enabled.

2.3.5 ATMVP

In some examples, when an ATMVP merge candidate is generated, the following steps are applied in order:

a. Check neighbouring blocks A1, B1, B0, A0 as shown in FIG. 2 in order, to find the first inter-coded, but not CPR-coded block, denoted as block X;

b. Initialize TMV=(0,0). If there is a MV (denoted as MVn) of block X, referring to the collocated reference picture (as signaled in the slice header), TMV is set equal to MVn.

c. Suppose the center point of the current block is (x0, y0), then locate a corresponding position of (x0,y0) as M=(x0+MV*x, y0+MV*y) in the collocated picture. Find the block Z covering M.
   i. If Z is intra-coded, then ATMVP is unavailable;
   ii. If Z is inter-coded, MVZ_0 and MVZ_1 for the two lists of block Z are scaled to (Reflist 0 index 0) and (Reflist 1 index 1) as MVdefault0, MVdefault1, and stored.
d. For each 8×8 sub-block, suppose its center point is (x0S, y0S), then locate a corresponding position of (x0S, y0S) as MS=(x0S+MV*x, y0S+MV*y) in the collocated picture. Find the block ZS covering MS.
   i. If ZS is intra-coded, MVdefault0, MVdefault1 are assigned to the sub-block;
   ii. If ZS is inter-coded, MVZS_0 and MVZS_1 for the two lists of block ZS are scaled to (Reflist 0 index 0) and (Reflist 1 index 0) and are assigned to the sub-block;

2.3.5.1 MV Clipping and Masking in ATMVP:

When locating a corresponding position such as M or MS in the collocated picture, it is clipped to be inside a predefined region. The CTU size is S×S, S=128. Suppose the top-left position of the collocated CTU is (xCTU, yCTU), then the corresponding position M or MS at (xN, yN) will be clipped into the valid region xCTU<=xN<xCTU+S+4; yCTU<=yN<yCTU+S.

Besides Clipping, (xN, yN) is also masked as xN=xN&MASK, yN=yN&MASK, where MASK is an integer equal to ~($2^N$−1), and N=3, to set the lowest 3 bits to be 0. So xN and yN must be numbers which are times of 8. ("~" represents the bitwise complement operator).

FIG. 26 shows an example of a valid corresponding region in the collocated picture.

2.3.6 Merge List Design in VVC

There are three different merge list construction processes supported in VVC:
1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.
2) Uni-Prediction TPM merge list: For triangular prediction mode, one merge list construction process for the two partitions is shared even two partitions could select their own merge candidate index. When constructing this merge list, the spatial neighbouring blocks and two temporal blocks of the block are checked. The motion information derived from spatial neighbours and temporal blocks are called regular motion candidates herein. These regular motion candidates are further utilized to derive multiple TPM candidates. Please note the transform is performed in the whole block level, even two partitions may use different motion vectors for generating their own prediction blocks. Uni-Prediction TPM merge list size is fixed to be 5.
3) Regular merge list: For remaining coding blocks, one merge list construction process is shared. Here, the spatial/temporal/HMVP, pairwise combined bi-prediction merge candidates and zero motion candidates may be inserted in order. Regular merge list size is signaled in slice header, and maximum value is 6.

2.3.6.1 Sub-Block Merge Candidate List

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes affine merge candidates, and ATMVP candidate, and/or sub-block based STMVP candidate.

2.3.6.1.1

In an example, the ATMVP merge candidate in the normal merge list is moved to the first position of the affine merge list. Such that all the merge candidates in the new list (i.e., sub-block based merge candidate list) are based on sub-block coding tools.

2.3.6.1.2 Construction Process of the Sub-Block Merge Candidate List

In some examples, a special merge candidate list, known as sub-block merge candidate list (a.k.a affine merge candidate list) is added besides the regular merge candidate list. The sub-block merge candidate list is filled with candidates in the following order:
a. ATMVP candidate (maybe available or unavailable);
b. Inherited Affine candidates;
c. Constructed Affine candidates;
d. Padding as zero MV 4-parameter affine model 2.3.6.2 Regular Merge List Different from the merge list design, in VVC, the history-based motion vector prediction (HMVP) method is employed. In addition, the combined bi-predictive merge candidates described in 0 has been replaced by pairwise bi-predictive merge candidates.

2.3.6.2.1 HMVP

In HMVP, the previously coded motion information is stored. The motion information of a previously coded block is defined as an HMVP candidate. Multiple HMVP candidates are stored in a table, named as the HMVP table, and this table is maintained during the encoding/decoding process on-the-fly. The HMVP table is emptied when starting coding/decoding a new tile. Whenever there is an inter-coded non-affine/non-ATMVP block, the associated motion information is added to the last entry of the table as a new HMVP candidate. The overall coding flow is depicted in FIG. 27.

HMVP candidates could be used in both AMVP and merge candidate list construction processes. FIG. 28 depicts a modified merge candidate list construction process (highlighted in different shade). When the merge candidate list is not full after the TMVP candidate insertion, HMVP candidates stored in the HMVP table could be utilized to fill in the merge candidate list. Considering that one block usually has a higher correlation with the nearest neighboring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signaled, the merge candidate list construction process is terminated.

2.3.6.2.1.1 Two-Stage Pruning Procedures

There are two stages that pruning may be applied:
1) Updating the table: when one block is inter-coded and non-affine mode, its motion information is used to update the table, as a new HMVP candidate. Before adding the new HMVP candidate to the table, pruning is applied.
   If it is identical with any one of existing HMVP candidates in the table, the duplicated one is removed from the table and all the followed HMVP candidates are moved forward (i.e., with index decreased by 1) and the new HMVP candidate is added after all existing ones.

Otherwise, if the table is not full and it is not identical to any existing HMVP candidates in the table, it is directly added to the table after existing ones.

2) Adding HMVP candidates to the candidate list: HMVP candidates in the HMVP tables may be used in the merge/AVMP mode.

For the regular merge mode, when the merge list is not full after checking spatial and temporal merge candidates, the HMVP candidates in a HMVP table may be further checked based on the descending order of HMVP candidate indices.

For each HMVP candidate to be checked, it is compared to all previously added merge candidates (i.e., those have been added to the merge list), if none of existing ones are identical the HMVP candidate, such a HMVP candidate is added to the merge list. Otherwise, if the HMVP candidate is identical to one of the existing ones, it is not added to the merge list.

2.3.6.2.2 Pairwise Average Candidates

Pairwise average candidates are generated by averaging predefined pairs of candidates in the current merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid. The pairwise average candidates replaces the combined candidates in HEVC standard. Suppose the MVs of two merge candidates are MV0=(MV0$x$, MV0$y$) and MV1=(MV1$x$, MV1$y$), then the MV of the pairwise merge candidate denoted as MV*=(MV*x, MV*y) is derived as $$MV^*x=(MV0x+MV1x)/2;$$

$$MV^*y=(MV0y+MV1y)/2;$$

In addition, when MV0 and MV1 refer to the current picture (i.e., CPR mode), MV*x and MV*y are further rounded to remove the part with a higher precision than full pixel to make sure the integer MV is obtained:

$$MV^*x=(MV^*x/16)<<4;$$

$$MV^*y=(MV^*y/16)<<4;$$

It is noted that for each pair, if one of the two is coded with CPR and the other is not, such pair is disallowed to generate the pairwise average candidate.

2.3.6.2.3 Regular Merge List Construction Process

When a block is predicted using the regular merge mode, an index pointing to an entry in the regular merge candidates list is parsed from the bitstream and used to retrieve the motion information. The construction of this list is specified in the current VVC standard and can be summarized according to the following sequence of steps with changes compared to HEVC are bold faced in bigger font size:

Step 1: Initial candidates derivation
 Step 1.1: Spatial candidates derivation
 Step 1.2: Redundancy check/removal for spatial candidates
 Step 1.3: Temporal candidates derivation
 Step 1.4: HMVP candidates with redundancy check/removal (newly introduced by VVC compared to HEVC)

Step 2: Virtual candidates insertion
 Step 2.1: Creation of pairwise bi-predictive candidates (replace the original combined bi-predictive candidates in HEVC)
 Step 2.2: Insertion of default motion candidates (zero motion candidates)

2.3.7 MHIntra

With inter-intra prediction mode, multi-hypothesis prediction combines one intra prediction and one merge indexed prediction. Such a block is treated as a special inter-coded block. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is exclusive of the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling.

The weights for combining predictions are described as follow. When DC or planar mode is selected or the CB width or height is smaller than 4, equal weights are applied. For those CBs with CB width and height larger than or equal to 4, when horizontal/vertical mode is selected, one CB is first vertically/horizontally split into four equal-area regions. Each weight set, denoted as (w_intrai, w_interi), where i is from 1 to 4 and (w_intra1, w_inter1)=(6, 2), (w_intra2, w_inter2)=(5, 3), (w_intra3, w_inter3)=(3, 5), and (w_intra4, w_inter4)=(2, 6), will be applied to a corresponding region. (w_intra1, w_inter1) is for the region closest to the reference samples and (w_intra4, w_inter4) is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs.

2.3.7.1 Signaling of Intra Prediction Modes in MHIntra-Coded Blocks

When inter-intra mode is used, one of the four allowed intra-prediction modes, DC, Planar, Horizontal and Vertical is selected and signaled. Three Most Probable Modes (MPMs) are constructed from the left and above neighbouring blocks. The intra-prediction mode of an intra-coded neighbouring block or an IIP-coded neighbouring block is treated as one MPM. If the intra-prediction mode is not one of the four allowed intra-prediction modes, it will be rounded to vertical mode or horizontal mode depending on the angular difference. The neighbouring block must be in the same CTU line as the current block.

Suppose the width and height of the current block is W and H. If W>2*H or H>2*W, then only one of the three MPMs can be used in the inter-intra mode. Otherwise, all the four valid intra-prediction modes can be used in the inter-intra mode.

It should be noted that the intra-prediction mode in inter-intra mode cannot be used to predict intra-prediction mode in a normal intra-coded block.

Inter-intra prediction can only be used when W*H>=64.

2.3.8 MMVD

In an example, ultimate motion vector expression (UMVE, also known as merge with motion vector differences (MMVD)) is presented. UMVE is used for either skip or merge modes with a proposed motion vector expression method.

UMVE re-uses merge candidate as same as those included in the regular merge candidate list in VVC. Among the merge candidates, one or multipole of them (named base candidates) can be selected, and is further expanded by the proposed motion vector expression method.

UMVE provides a new motion vector difference (MVD) representation method, in which a starting point, a motion magnitude and a motion direction are used to represent a MVD.

FIG. 29 shows an example of a UMVE search process.
FIG. 30 shows an example of a UMVE search point.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 2

| Distance IDX | | | | | | | | |
|---|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

UMVE flag is singnaled right after sending a skip flag or merge flag. If skip or merge flag is true, UMVE flag is parsed. If UMVE flage is equal to 1, UMVE syntax elements are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

3. Examples of Problems Solved by Embodiments Disclosed in the Present Document In the current design of VVC, three different merge list are utilized with different procedures which increases the hardware implementation cost.
1) Full pruning is applied to TPM candidates wherein each TPM candidate to be inserted is compared to all existing ones in the list. Such a design result in low throughput for motion vector derivation.
2) Two-stage pruning operations (first stage is to update the HMVP table that each new HMVP candidate is compared to all existing ones in the table, the second stage is to insert a HMVP candidate to the AMVP/merge candidate list wherein a HMVP candidate is compared to other non-HMVP candidates (e.g., spatial and temporal merge candidates). Compared to the one-stage pruning operations, such as only the second stage is applied, the current design could bring better coding gain with the same number of pruning operations since all the HMVP candidates in the table are unique ones.
3) When adding one HMVP candidate, full pruning is applied to compare a HMVP candidate with all existing non-HMVP candidate in the merge list.
4) The TPM merge list/number of MMVD base candidates are fixed to be 5 or 2. Such a design is not friendly for encoder implementation with different capability.

4. Example Embodiments and Techniques

The detailed inventions below should be considered as examples to explain general concepts. These inventions should not be interpreted in a narrow way. Furthermore, these inventions can be combined in any manner.

In the following descriptions, we use 'triangular partition mode' to represent one as an example of the non-square/non-rectangular partition mode (TPM), and the motion vector prediction candidate inserted to TPM candidate list is named 'TPM candidates'. It should be noted other kinds of partitions may be also applicable. The proposed methods for the TPM candidate list could be applied to any other motion candidate list of non-square/non-rectangular partitions, e.g., geometry partitions.

The proposed methods may be applied to any kinds of motion candidate list construction process (including, but not limited to AMVP/Merge list construction for regular translational motion or TPM candidates or affine motion candidates).

Suppose the (N+1) motion candidates before pruning are denoted by $MCand_0$, $MCand_1$, ..., $MCand_N$ in order.
1. The motion candidates may be classified to different categories with different pruning methods, in one example, the classification may be based on the associated index before pruning and/or based on the number of available motion candidates in the list before adding a new one.
  a. In one example, for candidates within a category, how to apply pruning may be the same.
  b. In one example, the pruning methods that one category may choose from, may include but not limited to, applying full pruning; applying partial pruning, no pruning before adding a candidate in this category to the candidate list.
  c. The candidates may be classified into different categories based on the indices of candidates. The pruning method may be selected based on the categories.
    i. For example, index idx within a range [StartIdx, $K_0$], full pruning may be applied when adding $MCand_{idx}$; for index idx within a range [$K_0+1$, $K_1$], partial pruning may be applied when adding $MCand_{idx}$; for the remaining index idx (i.e., within a range [$K_1+1$, N]), no pruning is applied, that is, $MCand_{idx}$ may be directly added if the list is not full.
    ii. For example, index idx within a range [StartIdx, $K_0$], either full or partial pruning may be applied when adding $MCand_{idx}$; for index idx within a range [$K_0+1$, N], no pruning is applied, that is, $MCand_{idx}$ may be directly added if the list is not full.
    iii. In one example, furthermore, for those candidates with index within the range [StartIdx, $K_0$], the determination of applying full or partial pruning may further depend on the number of available candidates in the list.
  d. The pruning method may be selected based on the status of the candidate list. The status includes information such as how many candidates are in the list and/or which kinds of candidates are already in the list.
    i. In one example, if there are already equal to or more than L available candidates in the list before adding a new one, partial pruning may be applied.
    ii. In one example, if there are less than L available candidates in the list before adding a new one, full pruning may be applied.
  e. How to apply a pruning method (including no pruning) may depend on the number of available candidates in the list.
    i. In one example, if there are less than $L_0$ available candidates in the list before adding a new one, full pruning may be applied.
    ii. In one example, if there are already equal to or more than $L_0$ available candidates in the list before adding a new one, partial pruning may be applied.
    iii. In one example, if there are already equal to or more than $L_1$ available candidates in the list before adding a new one, no pruning may be applied.
  f. In one example, for the full pruning process applied to one new candidate, such a candidate need to be compared to all existing (previously added) candidates in the candidate list.
    i. If there is one existing candidate is identical or similar to the new candidate, this new candidate is not added to the list.
    ii. If all existing candidates are not identical or similar to the new candidate, this new candidate may be added to the list, such as when the list is not full.
  g. In one example, for the partial pruning process, a candidate $MCand_{idx}$ may be compared to selective existing candidates (instead of all existing candidates) in the candidate list.
    i. If there is one existing candidate among the selective existing ones is identical or similar to the new candidate, this new candidate is not added to the list.
    ii. If all selective existing candidates are not identical or similar to the new candidate, this new candidate may be added to the list, such as when the list is not full.
  h. In one example, for the partial pruning process, a candidate $MCand_{idx}$ may be pruned to previously added M candidates with consecutive indices wherein M is smaller than idx, such as, $MCand_{idx}$ may be compared to ($MCand_{idx-1}$, $MCand_{idx-2}$, $MCand_{idx-3}$, ..., $MCand_{idx-M}$); or $MCand_{idx}$ may be compared to ($MCand_0$, $MCand_1$, $MCand_2$, ..., $MCand_M$). M may be fixed for all TPM candidates that partial pruning may be required. Alternatively, M may be changed for different candidate index (e.g., further based on how many candidates have been included in the list after pruning).
  i. Alternatively, for the partial pruning process, a candidate may be pruned to previously added candidates with non-consecutive indices, such as $MCand_{idx}$ may be compared to $MCand_{idx-1}$, $MCand_{idx-3}$, $MCand_{idx-5}$ ...;
  j. The variables (including StartIdx and/or $K_0$ and/or $K_1$ and/or L and/or $L_1$ and/or $L_1$ and/or M) may be pre-defined or signalled in SPS/VPS/PPS/picture header/slice header/tile group header/CTUs.
  k. The variables (including StartIdx and/or $K_0$ and/or $K_1$ and/or L and/or $L_1$ and/or $L_1$ and/or M) may further depend on the motion candidate list size, or slice type/picture type/tile type/low delay check flag/block dimension.
  l. In one example, $K_0$ may be set to 1. In another example $K_1$ may be set to $K_0$. In yet another example $K_1$ may be set to N.
  m. In one example, StartIdx is set to 1.
  n. The variables (including $K_0$ and/or $K_1$ and/or L and/or $L_1$ and/or $L_1$ and/or M) may be adaptively changed from block to block.
  o. The variable M may be further changed from one candidate to another one. That is, the number of candidates to be compared to (i.e., number of pruning operations) may be different for different candidates in a candidate list.
2. The motion candidates mentioned above may be TPM candidates derived from regular motion candidates (e.g., spatial/temporal motion candidates, and/or HMVP candidates, and/or pairwise average motion candidates).
  a. Alternatively, the motion candidates mentioned above may only refer to those TPM candidates derived from uni-prediction regular motion candidates (e.g., spatial/temporal motion candidates, and/or HMVP candidates, and/or pairwise average motion candidates with uni-prediction).
  b. Alternatively, the motion candidates mentioned above may only refer to those TPM candidates derived from bi-prediction regular motion candidates (e.g., spatial/temporal motion candidates, and/or HMVP candidates, and/or pairwise average motion candidates with bi-prediction).

3. The motion candidates mentioned above may refer to spatial/temporal motion candidates and selective HMVP candidates derived from one or multiple lookup tables.
   a. In one example, all the motion information of spatial/temporal, HMVP candidates are firstly obtained without pruning. Then the above methods may be applied.
4. The above methods may be only applicable to the HMVP candidates, i.e., how to apply pruning to HMVP candidates may depend on the category.
   a. In this case, the StartIdx may be defined as the number of available merge candidates before adding any HMVP candidates minus 1. For example, if there are M candidates before checking any HMVP candidates (e.g., $MCand_0$, $MCand_1$, ..., $MCand_{M-1}$ are spatial/temporal merge candidates).
      i. Alternatively, furthermore, the full pruning process is defined as comparing a HMVP candidate with all of the first M candidates.
      ii. Alternatively, furthermore, the partial pruning process is defined as comparing a HMVP candidate with partial of the first M candidates (i.e., a subset of the first M candidates).
      iii. Alternatively, furthermore, different subsets may be used for HMVP candidates with different indices.
   b. Alternatively, furthermore, other kinds of motion candidates (e.g., spatial/temporal merge candidate) may apply a different way for pruning process.
5. In the regular merge candidate list construction process, how to apply the pruning process for HMVP candidates (e.g., which of previously added merge candidates should be compared with a HMVP candidate) may depend on where merge candidates are derived from.
   a. In one example, one HMVP candidate may be compared to another merge candidate derived a given relative neighboring block.
   b. In one example, the selection of neighboring block which a HMVP candidate should be compared to may be the same for all HMVP candidates. For example, all HMVP candidates may be compared to the spatial merge candidate derived from the left block and/or temporal neighboring block.
   c. HMVP candidates with different indices may be compared to candidates derived from different blocks.
6. In the TPM candidate list construction process, how to apply the pruning process (e.g., which of previously added TPM candidates should be compared with a new candidate) may depend on which regular motion candidates those TPM candidates are derived from.
   a. Alternatively, furthermore, when pruning is enabled for TPM candidate insertion process, pruning is not applied to regular merge candidates derivation process.
7. For a candidate list, it may include above-mentioned motion candidates, after pruning if needed. In addition, it may also add other default motion candidates.
   a. In one example, the default motion candidates may be added without any pruning operations.
8. When a block is coded with certain types of motion candidates, the pruning operation for the HMVP table updating process is disabled.
   a. In one example, a certain type is defined as the virtual merge candidate type, which may include pairwise average merge candidate/zero motion candidate/default motion candidate/combined bi-predictive motion candidate.
   b. In one example, a certain type is defined as the temporal merge candidate type.
   c. In one example, a certain type is defined as those motion candidates associated with intra-inter coded blocks.
   d. In one example, when the pruning operation for the HMVP table updating process is disabled, the motion information of one block and/or those derived from the motion information of one block may be directly added to the table after all existing HMVP candidates.
   e. Alternatively, when the pruning operation for the HMVP table updating process is disabled, the motion information of one block and/or those derived from the motion information of one block are disallowed to update the HMVP tables.
9. When a block is coded with certain dimension, the pruning operation for the HMVP table updating process is disabled.
   a. In one example, the dimension is set to 4×4.
   b. In one example, the dimension is set to any block size with number of samples equal to and/or smaller than a threshold (e.g., 64).
   c. W>=T0 and/or H>=T1, e.g., T0 and T1 are both set to 64.
10. Indications of the maximum number of candidates allowed in the TPM merge candidate list may be signaled in the bit-stream. For example, it may be signaled in SPS/VPS/PPS/picture header/slice header/tile group header/CTUs.
    a. The maximum number may be directly signalled. Alternatively, the difference between a given value K and the maximum number may be signalled, e.g., K is set to 5 or 6.
    b. In one example, the signaled maximum number of candidates allowed in the TPM merge candidate (denoted as M2) cannot be larger than the maximum number of candidates allowed in the regular merge candidate list (denoted as M1).
       i. For example, M1-M2 is signaled as a non-negative integer.
    c. Alternatively, it is not signalled, but inferred to be the same as M1.
    d. In one example, truncated unary code or unary code is applied to code such indication of maximum number of candidates allowed in the TPM merge candidate list.
11. Indications of the maximum number of base merge candidates allowed in the MMVD merge candidate list may be signaled in the bit-stream. For example, it may be signaled in SPS/VPS/PPS/picture header/slice header/tile group header/CTUs.
    a. In one example, the difference between a given value K and the maximum number may be signalled, e.g., K is set to 5 or 6.
    b. In one example, the signaled maximum number of candidates allowed in the MMVD merge candidate is denoted as M2, the maximum number of candidates allowed in the regular merge candidate list is denoted as M1.
       i. For example, M1-M2 is signaled as a non-negative integer.

c. In one example, truncated unary code or unary code is applied to code such indication of maximum number of base merge candidates.
12. Indications of the maximum number of base merge candidates allowed in the sub-block based MMVD merge candidate list may be signaled in the bit-stream. For example, it may be signaled in SPS/VPS/PPS/picture header/slice header/tile group header/CTUs.
    a. In one example, the difference between a given value K and the maximum number may be signalled, e.g., K is set to 5 or 6.
    b. In one example, the signaled maximum number of candidates allowed in the sub-block based MMVD merge candidate is denoted as M2, the maximum number of candidates allowed in the sub-block merge candidate list is denoted as M1.
        i. For example, M1-M2 is signaled as a non-negative integer.
    c. In one example, truncated unary code or unary code is applied to code such indication of maximum number of base merge candidates.
13. When affine mode may be allowed for TPM coded blocks, the TPM candidates may be derived from those affine candidates (named regular affine candidate) derived for current sub-block merge candidate list.
    a. In one example, if one bi-prediction affine candidate is used, the list 0 and list 1 motion information of one affine candidate may be used independently as two uni-prediction affine candidates, i.e., to generate two TPM affine candidates.
14. When affine mode may be allowed for TPM coded blocks, the maximum number of candidates allowed in the TPM-affine merge candidate list may be signaled in the bit-stream. For example, it may be signaled in SPS/VPS/PPS/picture header/slice header/tile group header/CTUs.
    a. The maximum number may be directly signalled. Alternatively, the difference between a given value K and the maximum number may be signalled, e.g., K is set to 5 or 6.
    b. In one example, the signaled maximum number of candidates allowed in the TPM-affine merge candidate (denoted as M2) cannot be larger than the maximum number of candidates allowed in the sub-block merge candidate list or cannot be larger than that in the affine merge candidate list (denoted as M1).
        i. For example, M1-M2 is signaled as a non-negative integer.
            a. In one example, it is binarized with the unary code.
    c. In one example, differences between M2 and M1 may be signalled instead.
    d. Alternatively, it is not signalled, but inferred to be the same as M1.

5. Embodiment 5.1 Embodiment #1: Uni-Prediction Candidate List for TPM (No Pruning for Regular Motion Candidates and Limited Pruning for TPM Candidates)

The following steps are involved to derive the TPM list and redundancy check (pruning process) for regular motion candidates are removed and TPM candidates pruning is applied.

An example is described as follows:
1. Obtain regular motion candidates from $A_1, B_1, B_0, A_0, B_2$ (corresponding to block 1-5 in FIG. 14) without pruning
2. Obtain regular motion candidates from Col1 and/or Col2 (corresponding to block 6-7 in FIG. 14) without pruning
3. Obtain regular motion candidates from HMVP candidates without pruning.
4. Set variable numCurrMrgCand=0, numCheckedCand=0;
5. For each available regular motion candidate and numCurrMrgCand is less than M, the following steps are performed to add TPM candidates to the list:
    If the regular motion candidate is uni-prediction (either from List 0 or List 1),
        1) If numCheckedCand is smaller than Thres,
            pruning function PF(numCurrMrgCand) is applied to the regular motion candidate. If the pruning process returns false (i.e., no identical or similar TPM candidates found), such a regular motion candidate added to the merge list as an TPM candidate with numCurrMrgCand increased by 1.
            Otherwise (numCheckedCand is equal to or larger than Thres), it is directly added to the merge list as an TPM candidate with numCurrMrgCand increased by 1.
        2) numCheckedCand increased by 1.
    If the regular motion candidate is bi-prediction, add the following two candidate in order.
        1) The motion information from List 0 (that is, modified to be uni-prediction from List 0) is set to be a first new TPM candidate.
        2) If numCheckedCand is smaller than Thres,
            pruning function PF(numCurrMrgCand) is invoked to the first new TPM candidate. If the pruning process returns false, such a first new TPM candidate added to the merge list as an TPM candidate with numCurrMrgCand increased by 1.
            Otherwise(numCheckedCand is equal to or larger than Thres), it is directly added to the merge list as an TPM candidate with numCurrMrgCand increased by 1.
        3) numCheckedCand increased by 1.
        4) The motion information from List 1 (that is, modified to be uni-prediction from List 1) is set to be a second new TPM candidate.
        5) If numCheckedCand is smaller than Thres,
            pruning function PF(numCurrMrgCand) is invoked to the second new TPM candidate. If the pruning process returns false, such a second new TPM candidate added to the merge list as an TPM candidate with numCurrMrgCand increased by 1.
            Otherwise (numCheckedCand is equal to or larger than Thres), it is directly added to the merge list as an TPM candidate with numCurrMrgCand increased by 1.
        6) numCheckedCand increased by 1.
6. If numCurrMrgCand is less than M, default motion candidates are added in order till numCurrMrgCand equal to M.
    In one example, default motion candidates are added in the following steps in order till numCurrMrgCand equal to M:
    Set a variable numRef=minimum (number of reference pictures in list 0, number of reference pictures in list 1).
    For each i being 0 . . . numRef−1, i) add a default motion candidate with MV set to (0,0) and reference picture index set to i, prediction direction set to list 0, and numCurrMrgCand increased by 1.

ii) add a default motion candidate with MV set to (0,0) and reference picture index set to i, prediction direction set to list 1, and numCurrMrgCand increased by 1.

Set variable numPrevMrgCand=numCurrMrgCand.

For i being 0 . . . (M-numPrevMrgCand-1), add a default motion candidate with MV set to (0,0) and reference picture index set to 0, prediction direction set to list 0, and numCurrMergeCand increased by 1.

Definition of the function PF(x):

Set starting index=(x>=Thres2)?L:0;

Set ending index=x−1

For each i being [starting index, ending index], inclusively, if the new candidate is identical (or similar) to the i-th candidate in the list, true;

If none of the candidates with index within [starting index, ending index] in the list, return false.

Note the variables Thres, Thres2, M may be pre-defined or signalled. In one example, Thres is set to 5, 6 or 7, and Thres2 is set to 4.

FIG. 31 is a block diagram of a video processing apparatus 2600. The apparatus 2600 may be used to implement one or more of the methods described herein. The apparatus 2600 may be embodied in a smartphone, tablet, computer, Internet of Things (IoT) receiver, and so on. The apparatus 2600 may include one or more processors 2602, one or more memories 2604 and video processing hardware 2606. The processor(s) 2602 may be configured to implement one or more methods described in the present document. The memory (memories) 2604 may be used for storing data and code used for implementing the methods and techniques described herein. The video processing hardware 2606 may be used to implement, in hardware circuitry, some techniques described in the present document.

FIG. 32 is a flowchart for an example method 3200 of video processing. The method 3200 includes generating (3202), during a conversion between a video comprising a current video block and a bitstream representation of the current video block, a list of motion candidates, categorizing (3204) the list of motion candidates into a number of categories of motion candidates, wherein each category is assigned a corresponding rule of pruning and performing (3206) the conversion by performing the pruning using a pruning method according to the rule of pruning to decide whether a motion candidate could be added to a final list of motion candidates and decoding the block based on the final list.

It will be appreciated that several techniques have been disclosed that will benefit video encoder and decoder embodiments incorporated within video processing devices such as smartphones, laptops, desktops, and similar devices by allowing the use of ATMVP coding tool in encoding or decoding of video or images. Various embodiments and techniques may be described using the following clause-based description.

1. A method of video processing, comprising:

generating, during a conversion between a video comprising a current video block and a bitstream representation of the current video block, a list of motion candidates, categorizing the list of motion candidates into a number of categories of motion candidates, wherein each category is assigned a corresponding rule of pruning; and performing the conversion by performing the pruning using a pruning method according to the rule of pruning to decide whether a motion candidate could be added to a final list of motion candidates and decoding the block based on the final list.

2. The method of clause 1, wherein the categorizing is based on indexes of the motion candidates.

3. The method of any of clauses 1-2, wherein the pruning method may include full pruning, partial pruning or no-pruning prior to adding a motion candidate to the final list of motion candidates.

4. The method of any of clauses 1-3, wherein a first category includes motion candidates with indexes in a range [StartIdx, K0], a second category includes motion candidates with indexes in a range [K0+1, K1], and wherein a third category includes remaining motion candidates in a range [K1+1, N], where StartIdx, K0, K1 and N are integers.

5. The method of clause 4, wherein the rule of pruning specifies using full pruning for the first category, partial pruning for the second category and no pruning for the third category.

6. The method of clause 4, wherein the rule of pruning specifies using full pruning and partial pruning for the first category, and no pruning is applied for the second category.

7. The method of any of clauses 1-6, wherein the rule of pruning is dependent on a status of the list of motion candidates.

8. The method of clause 7, wherein the status of the list of motion candidates includes a number of motion candidates in the final list of motion candidates or a type of candidates in the list of motion candidates.

9. The method of any of clauses 1-8, wherein the motion candidates in the list of motion candidates includes at least some geometry partition mode motion candidates that are derived from regular motion candidates.

10. The method of clause 3, wherein full pruning includes, for a new candidate, comparing the new candidate to all existing candidates in the final list of motion candidates, wherein (1) the new candidate is not added to the final list of motion candidates in case that an existing candidate is identical to the new candidate, or (2) in case that the new candidate is identical to another existing candidate, adding the new candidate to the final list of motion candidates only in case that the list of motion candidates is not full.

11. The method of clause 3, wherein partial pruning includes at least one of (1) pruning a new candidate MCandidx to previously added M candidates with consecutive indices wherein M is smaller than idx, or (2) pruning a new candidates MCandidx to previously added M candidates with non-consecutive indices, where M is an integer.

12. The method of clause 11, wherein MCandidx is compared to (MCandidx-1, MCandidx-2, MCandidx-3, . . . , MCandidx-M); or MCandidx is compared to (MCand0, MCand1, MCand2, . . . , MCandM).

13. The method of clause 12, wherein M is a fixed number for all candidates.

14. The method of clause 12, wherein M is changed for different candidate indexes.

15. The method of any of clauses 4-14, wherein the list of motion candidates corresponds to history based motion vector predictor (HMVP) candidates.

16. The method of clause 15, wherein the StartIdx is one less than a number of available motion candidates prior to adding the HMVP candidates.

17. The method of any of clauses 15-16, wherein the full pruning process includes comparing the HMVP candidates with all first M candidates in the list of motion candidates.

18. A method of video processing, comprising:

generating a regular merge candidate list by applying a pruning process to history based motion vector predictor (HMVP) candidates using a rule that is based on where merge candidates are derived from, and performing a conversion between a current video block and a bitstream representation of the current video block using the regular merge candidate list.

19. The method of clause 18, wherein the pruning process includes comparing the HMVP candidates with a merge candidate derived for a neighboring block.

20. The method of clause 19, wherein the neighboring block corresponds to a left block or a temporal neighboring block.

21. The method of any of clauses 18-20, wherein HMVP candidates having different indexes are compared with merge candidates derived from different video blocks.

22. A method of video processing, comprising:

generating a candidate list by applying a pruning process to geometry predictor mode candidates using a rule that is based on where regular motion vectors from which the geometry predictor mode candidates are derived, and performing a conversion between a current video block and a bitstream representation of the current video block using the candidate list.

23. The method of clause 22, wherein the generating the candidate list includes refraining from applying pruning to regular merge candidates.

24. The method of any of clauses 18-23 wherein the candidate list is generated by adding default motion candidates.

25. The method of clause 24, wherein the default motion candidates are added without pruning.

26. A method of video processing, comprising:

performing a determination, for a conversion between a current video block and a bitstream representation of the current video block, to disable use of a pruning operation for history based motion vector predictor table updating processes, wherein the determination is based on a video characteristic; and performing the conversion based on the determination to disable use of the pruning operation.

27. The method of clause 26, wherein the video characteristic is a type of motion vector or a dimension of the current video block.

28. A method of video processing, comprising:

performing a determination of a maximum number of candidates allowed for at least one of (1) a geometry prediction mode merge candidate list for a current video block, or (2) a maximum number of base merge candidates in a motion vector difference (MMVD) merge candidate list, or (3) a maximum number of merge candidates in a sub-block based MMVD merge candidate list, or (4) a maximum number of affine merge candidates in a geometry prediction mode list; and performing, based on the determination, a conversion between the current video block and a bitstream representation of the current block, wherein the maximum number of candidates is signaled in an indicator in the bitstream representation.

29. The method of clause 28, wherein the indicator corresponds to a difference between the maximum number of candidates allowed minus K, where K is an integer.

30. The method of clause 29, wherein K=5 or 6.

31. The method of any of clauses 28-30, wherein the maximum number of candidates allowed is M2, and M2 is not greater than M1, where M1 is a maximum number of candidates in a regular merge candidate list.

32. The method of clause 31, wherein the indicator signals a difference between M1 and M2.

33. The method of any of clauses 28-32, wherein the indicator is includes in the bitstream representation at a sequence parameter set level or a video parameter set level or a picture parameter set level or a picture header level or a slice header level or a tile group header level or a coding tree unit level.

34. A method of video processing, comprising:

performing a determination of a maximum number of candidates allowed for at least one of (1) a geometry prediction mode merge candidate list for a current video block, or (2) a maximum number of base merge candidates in a motion vector difference (MMVD) merge candidate list, or (3) a maximum number of merge candidates in a sub-block based MMVD merge candidate list or (4) a maximum number of affine merge candidates in a geometry prediction mode list; and performing, based on the determination, a conversion between the current video block and a bitstream representation of the current block, wherein the maximum number of candidates allowed is determined to be equal to a maximum number of candidates in a regular merge candidate list.

35. The method of any of clauses 1-34, wherein the conversion includes generating the bitstream representation from pixel values of the current video block.

36. The method of any of clauses 1-34, wherein the conversion includes generating pixel values of the current video block from the bitstream representation.

37. A video encoder apparatus comprising a processor configured to implement a method recited in any one or more of clauses 1-34.

38. A video decoder apparatus comprising a processor configured to implement a method recited in any one or more of clauses 1-34.

39. A computer program product stored on a non-transitory computer readable media, the computer program product including program code for carrying out the method in any one of clauses 1 to 34.

FIG. 33 is a flowchart for an example method 3300 of video processing. The method 3300 includes determining (3302), an indication that indicates a maximum number of candidates allowed in a candidate list for at least one video block in a video, and performing (3304) video processing on the at least one video block based on the indication.

In some examples, the maximum number of candidates allowed in the candidate list corresponds to at least one of a maximum number of candidates in a geometry partition mode (GEO) based merge candidate list, a maximum number of base candidates in a merge with motion vector difference (MMVD) merge candidate list, a maximum number of base candidates in a sub-block based MMVD merge candidate list, and a maximum number of candidates in a geometry partition mode based affine merge candidate list.

In some examples, the at least one video block is split into two or more partitions according to a splitting direction in the geometry partition mode.

In some examples, the two or more partitions comprises a non-rectangle/non-square partition.

In some examples, the geometry partition mode comprises a triangular partition mode (TPM) with only two partitions.

In some examples, the indication corresponds to a value of the maximum number of candidates or corresponds to a difference value between the maximum number of candidates and a first value.

In some examples, the first value is set as 5 or 6.

In some examples, wherein the maximum number of candidates allowed in the candidate list is not larger than a maximum number of candidates in a corresponding regular merge candidate list.

In some examples, the indication corresponds to a difference value resulted from the maximum number of candidates in the regular merge candidate list minus the maximum number of candidates allowed in the candidate list.

In some examples, wherein the indication is signalled in at least one of sequence level, picture level, slice level, title group level, and coding tree unit (CTU) level.

In some examples, the indication is signalled in at least one of Sequence parameter set (SPS), video parameter set (VPS), picture parameter set (PPS), picture header, slice header, title group header, and coding tree unit (CTU).

In some examples, the maximum number of candidates allowed in the candidate list is inferred to be equal to the maximum number of candidates in the corresponding regular merge candidate list.

In some examples, the indication is coded with a truncated unary code or a unary code.

In some examples, wherein the candidates in the geometry partition mode based affine merge candidate list are generated from regular affine candidates derived from a sub-block based merge candidate list.

In some examples, a regular bi-predictive affine candidate is used to derive two uni-predictive affine candidates as two candidates in the geometry partition mode based affine merge candidate list.

In some examples, the candidates in the corresponding regular merge candidate list comprises merging motion vector prediction (MVP) candidates.

In some examples, the video processing comprises at least one of encoding the indication into the bitstream representation of the video and decoding the indication from the bitstream representation of the video.

In one example aspect, an apparatus for video processing is disclosed. The apparatus includes a processor configured to implement the methods described above.

In one example aspect, a computer program product stored on a non-transitory computer readable media is disclosed. The computer program product includes program code for carrying out the methods described above.

It will be appreciated by one of skill in the art that techniques for using motion candidate lists under various video coding scenarios are disclosed. Video blocks may be encoded into bitstream representations that include non-contiguous bits that are placed in various headers or in network adaption layer, and so on.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of video processing, comprising:
performing a conversion between a first block in a video unit of a video and a bitstream of the video, wherein the first block is coded with a geometric partitioning mode;
wherein the bitstream comprises a field indicative of a maximum number of allowed motion candidates in a geometric partitioning merge candidate list that is constructed for the first block coded with the geometric partitioning mode that is enabled in the video unit; and
wherein the maximum number of allowed motion candidates in a geometric partitioning merge candidate list that is constructed for the first block coded with the geometric partitioning mode is derived based on a maximum number of allowed motion candidates in a regular merge candidate list that is constructed for a second block coded with a regular merge mode,
wherein the field is set to a difference value equal to the maximum number of allowed motion candidates in the regular merge candidate list that is constructed for the second block coded with the regular merge mode minus the maximum number of allowed motion candidates in the geometric partitioning merge candidate list that is constructed for the first block coded with the geometric partitioning mode.

2. The method of claim 1, wherein the geometric partitioning mode comprises at least one partition scheme which divides the first block into two partitions, at least one of which is non-square and non-rectangular.

3. The method of claim 1, wherein the difference value is a non-negative integer.

4. The method of claim 1, wherein the field is signaled in sequence level.

5. The method of claim 1, wherein the field is signaled in a Sequence Parameter Set (SPS).

6. The method of claim 1, wherein in a case of the field not being included in the bitstream, the maximum number of allowed motion candidates for the geometric partitioning mode is defaulted to be equal to the maximum number of allowed motion candidates in the regular merge candidate list.

7. The method of claim 1, wherein for the second block coded with the regular merge mode, one index is signaled in the bitstream to indicate one motion candidate selected from the regular merge candidate list.

8. The method of claim 1, wherein for the first block coded with the geometric partitioning mode, two indices are signaled in the bitstream to indicate two candidates selected from the regular merge candidate list.

9. The method of claim 1, the method further comprising:
constructing the geometric partitioning merge candidate list based on the maximum number of allowed motion candidates for the geometric partitioning mode;
deriving motion information for the first block based on the geometric partitioning merge candidate list.

10. The method of claim 1, wherein the field is coded with a truncated unary code or a unary code.

11. The method of claim 1, wherein the conversion comprises encoding the first block into the bitstream.

12. The method of claim 1, wherein the conversion comprises decoding the first block from the bitstream.

13. An apparatus for processing video data comprising a processor and a non-transitory memory with instructions thereon, wherein the instructions upon execution by the processor, cause the processor to:
perform a conversion between a first block in a video unit of a video and a bitstream of the video, wherein the first block is coded with a geometric partitioning mode,
wherein the bitstream comprises a field indicative of a maximum number of allowed motion candidates in a geometric partitioning merge candidate list that is constructed for the first block coded with the geometric partitioning mode that is enabled in the video unit; and
wherein the maximum number of allowed motion candidates in the geometric partitioning merge candidate list that is constructed for the first block coded with the geometric partitioning mode is derived based on a maximum number of allowed motion candidates in a regular merge candidate list that is constructed for a second block coded with a regular merge mode,
wherein the field is set to a difference value equal to the maximum number of allowed motion candidates in the regular merge candidate list that is constructed for the second block coded with the regular merge mode minus the maximum number of allowed motion candidates in the geometric partitioning merge candidate list that is constructed for the first block coded with the geometric partitioning mode.

14. The apparatus of claim 13, wherein the geometric partitioning mode comprises at least one partition scheme which divides the first block into two partitions, at least one of which is non-square and non-rectangular.

15. The apparatus of claim 13, wherein the difference value is a non-negative integer.

16. The apparatus of claim 13, wherein the field is signaled in sequence level.

17. A non-transitory computer-readable storage medium storing instructions that cause a processor to:
perform a conversion between a first block in a video unit of a video and a bitstream of the video, wherein the first block is coded with a geometric partitioning mode;
wherein the bitstream comprises a field indicative of a maximum number of allowed motion candidates in a geometric partitioning merge candidate list that is constructed for the first block coded with the geometric partitioning mode that is enabled in the video unit; and
wherein the maximum number of allowed motion candidates in a geometric partitioning merge candidate list that is constructed for the first block coded with the geometric partitioning mode is derived based on a maximum number of allowed motion candidates in a regular merge candidate list that is constructed for a second block coded with a regular merge mode, wherein the field is set to a difference value equal to the maximum number of allowed motion candidates in the regular merge candidate list that is constructed for the second block coded with the regular merge mode minus the maximum number of allowed motion candidates in a geometric partitioning merge candidate list that is constructed for the first block coded with the geometric partitioning mode.

18. A non-transitory computer-readable recording medium storing a bitstream of a video which is generated by a method performed by a video processing apparatus, wherein the method comprises:

generating the bitstream based on a first block in a video unit of the video, wherein the first block is coded with a geometric partitioning mode;

wherein the bitstream comprises a field indicative of a maximum number of allowed motion candidates in a geometric partitioning merge candidate list that is constructed for the first block coded with the geometric partitioning mode that is enabled in the video unit; and wherein the maximum number of allowed motion candidates in a geometric partitioning merge candidate list that is constructed for the first block coded with the geometric partitioning mode is derived based on a maximum number of allowed motion candidates in a regular merge candidate list that is constructed for a second block coded with a regular merge mode, wherein the field is set to a difference value equal to the maximum number of allowed motion candidates in the regular merge candidate list that is constructed for the second block coded with the regular merge mode minus the maximum number of allowed motion candidates in a geometric partitioning merge candidate list that is constructed for the first block coded with the geometric partitioning mode.

19. The non-transitory computer-readable storage medium of claim 17, wherein the geometric partitioning mode comprises at least one partition scheme which divides the first block into two partitions, at least one of which is non-square and non-rectangular.

20. The non-transitory computer-readable recording medium of claim 18, wherein the geometric partitioning mode comprises at least one partition scheme which divides the first block into two partitions, at least one of which is non-square and non-rectangular.

* * * * *